(12) United States Patent
Potnis et al.

(10) Patent No.: US 6,216,489 B1
(45) Date of Patent: Apr. 17, 2001

(54) LIQUID DESICCANT AIR CONDITIONER

(75) Inventors: Shailesh V. Potnis; Robert Baumann, both of Effingham; Gregory W. Brandt, Wheeler, all of IL (US)

(73) Assignee: Fedders Corporation, NJ (US)

( * ) Notice: Subject to any disclaimer, the term of this patent is extended or adjusted under 35 U.S.C. 154(b) by 0 days.

(21) Appl. No.: 09/330,399

(22) Filed: Jun. 9, 1999

Related U.S. Application Data

(63) Continuation-in-part of application No. 09/131,287, filed on Aug. 7, 1998, which is a continuation-in-part of application No. 08/984,741, filed on Dec. 4, 1997, now Pat. No. 6,138,470.

(51) Int. Cl.[7] .............................. F25B 33/00; A23C 3/02
(52) U.S. Cl. ................................. 62/497; 165/66; 165/909
(58) Field of Search ................................ 62/497; 165/66, 165/909, 132

(56) References Cited

U.S. PATENT DOCUMENTS

| | | | |
|---|---|---|---|
| 4,372,372 | * | 2/1983 | Hunter . |
| 4,542,034 | * | 9/1985 | Aule et al. .......................... 165/66 X |
| 5,143,149 | * | 9/1992 | Kronberg .......................... 165/909 X |
| 5,213,154 | * | 5/1993 | Marsala et al. . |
| 6,068,047 | * | 5/2000 | Buchhave . |

\* cited by examiner

*Primary Examiner*—Corrine McDermott
*Assistant Examiner*—Chen-Wen Jiang
(74) *Attorney, Agent, or Firm*—Welsh & Katz, Ltd.

(57) ABSTRACT

A liquid desiccant air conditioner includes an absorption air conditioner and a liquid desiccant dehumidifier. The dehumidifier includes a liquid desiccant absorber for absorbing moisture contained in ambient air entering the dehumidifier, a boiler for boiling partially preheated dilute liquid desiccant to evaporate moisture to reconstitute the liquid desiccant into concentrated liquid desiccant, a first heat exchanger operable to transfer heat from the concentrated liquid desiccant to dilute liquid desiccant received from the desiccant absorber so as to raise the temperature of the dilute liquid desiccant to a first temperature, a condenser operative to receive partially heated dilute liquid desiccant from the first heat exchanger and receive steam generated by the boiler so as to sensibly heat the dilute liquid desiccant to a second temperature, and a second heat exchanger operable to transfer heat from concentrated liquid desiccant to the dilute liquid desiccant received from the condenser so as raise the temperature of the dilute liquid desiccant to a third temperature. The dilute liquid desiccant at the third temperature is directed to the boiler and the concentrated liquid desiccant from the second heat exchanger is directed to the first heat exchanger. A pump draws concentrated liquid desiccant from the boiler into the absorber. Steam from the boiler is also used to regenerate the refrigerant in the absorption air conditioner.

2 Claims, 25 Drawing Sheets

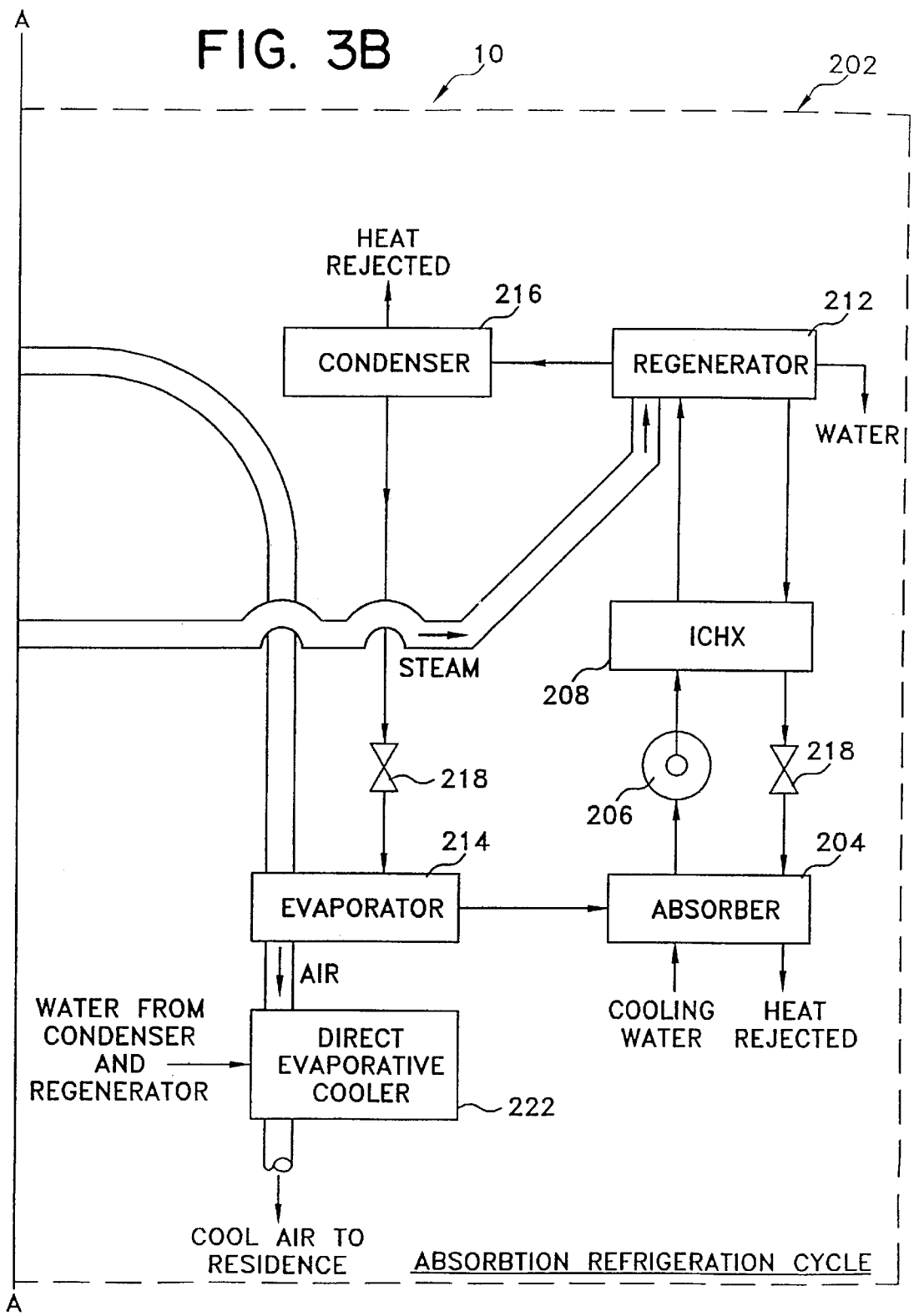

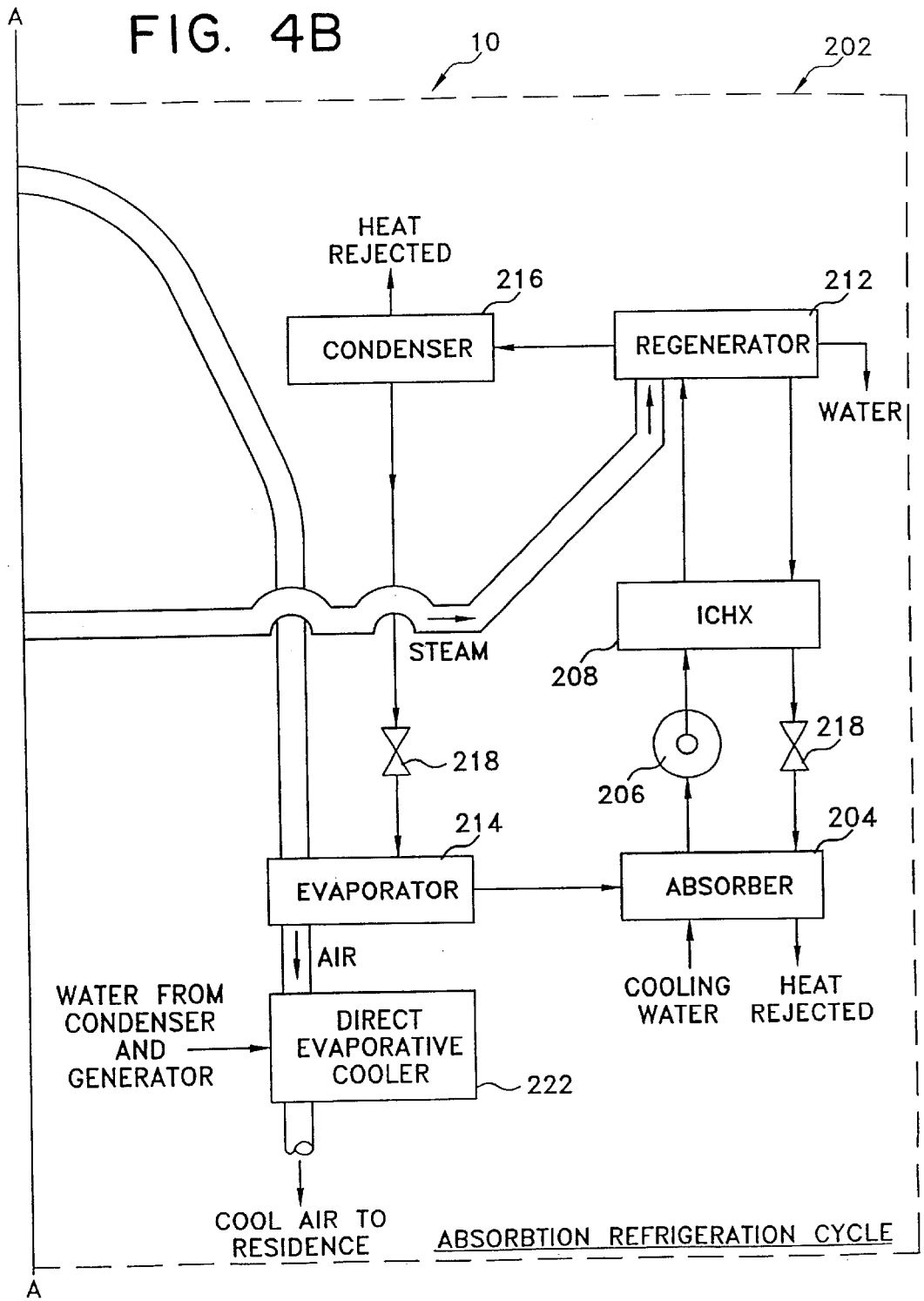

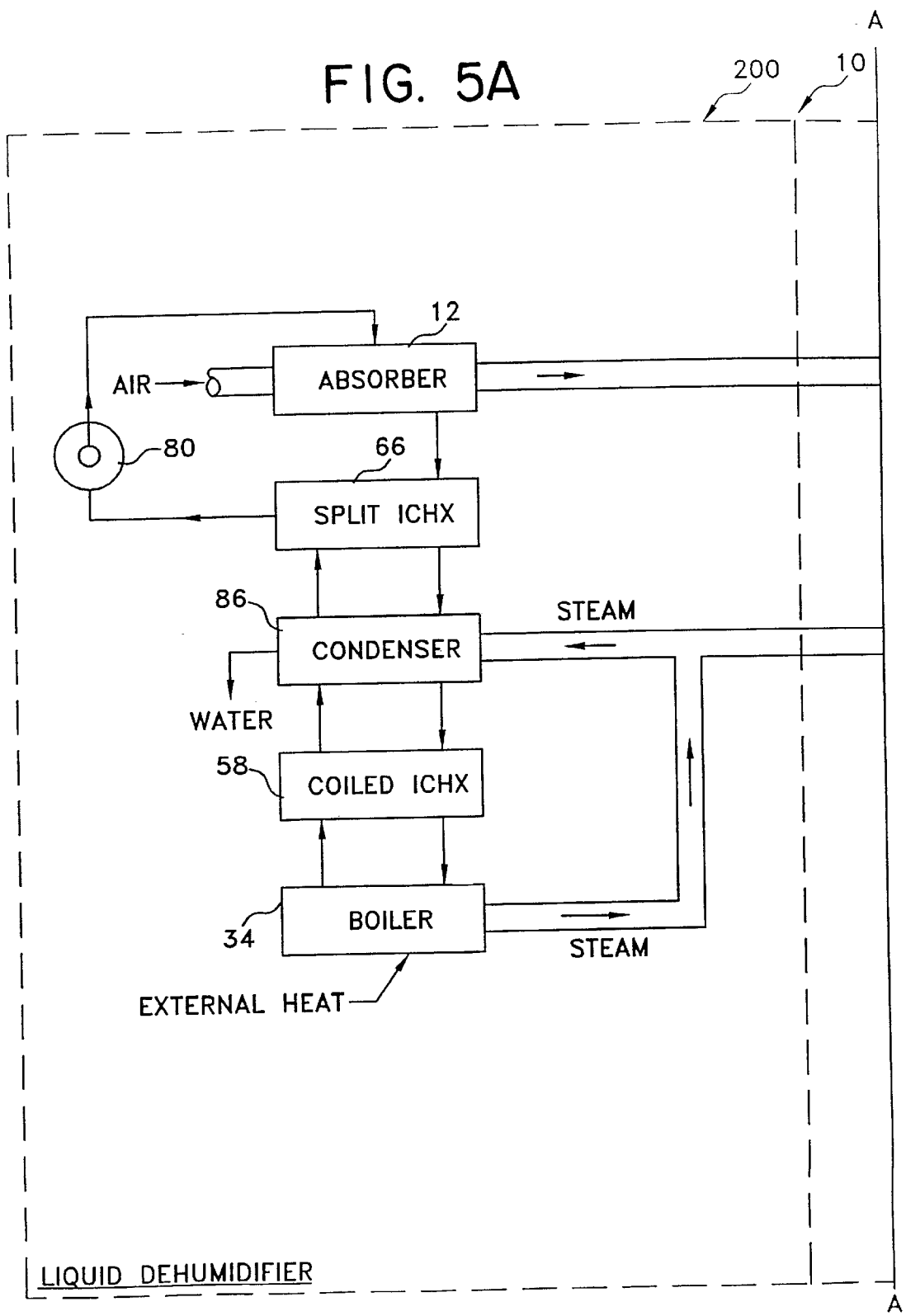

FIG. 9B
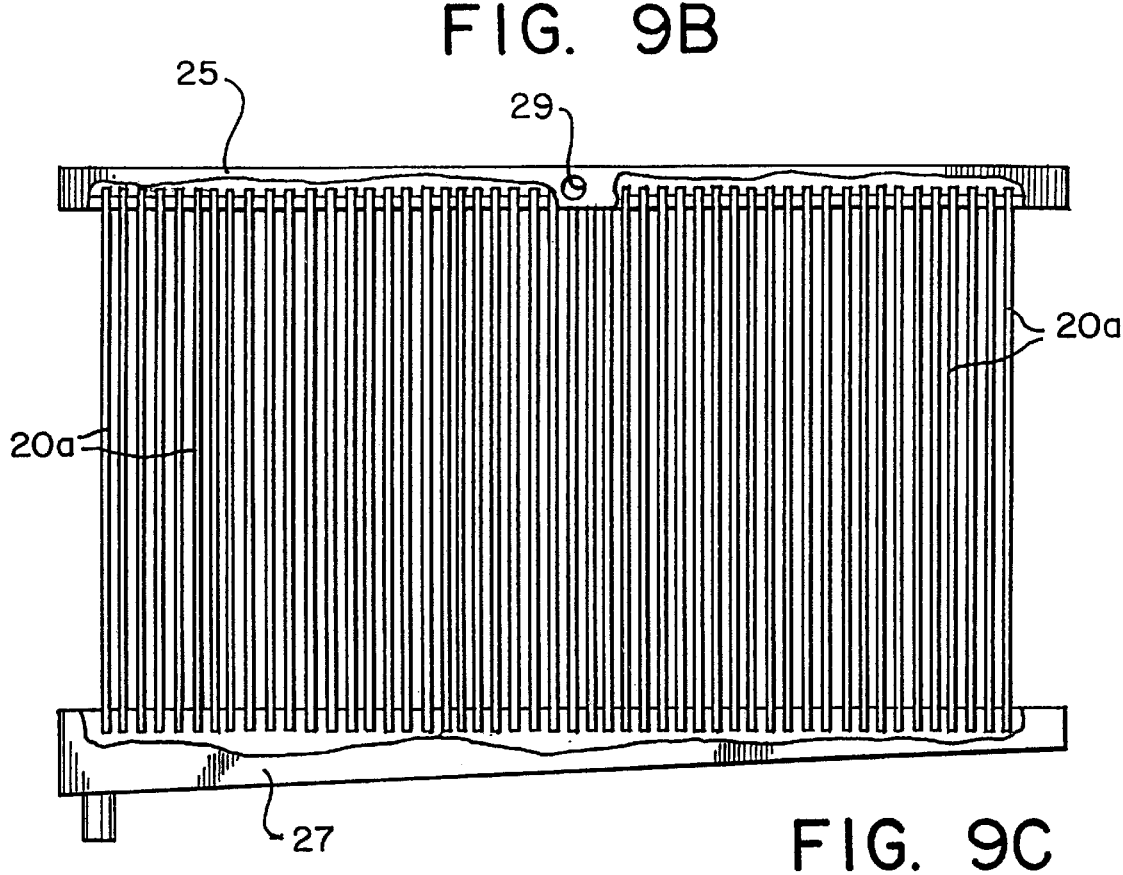
FIG. 9C
FIG. 10
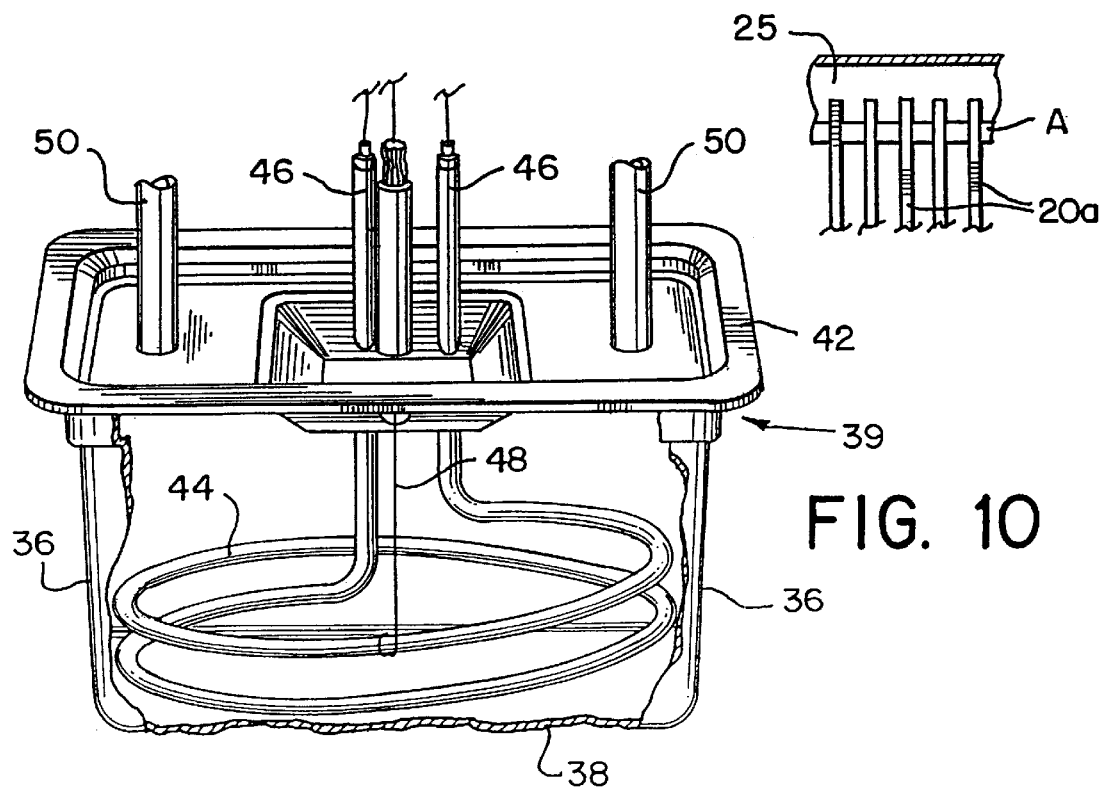

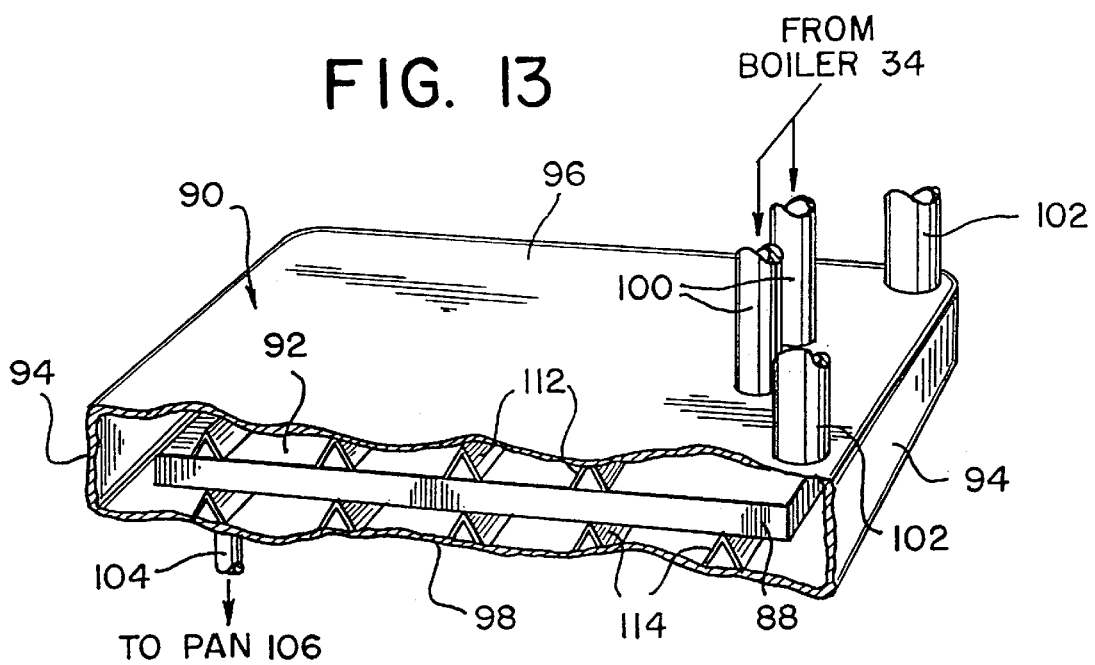
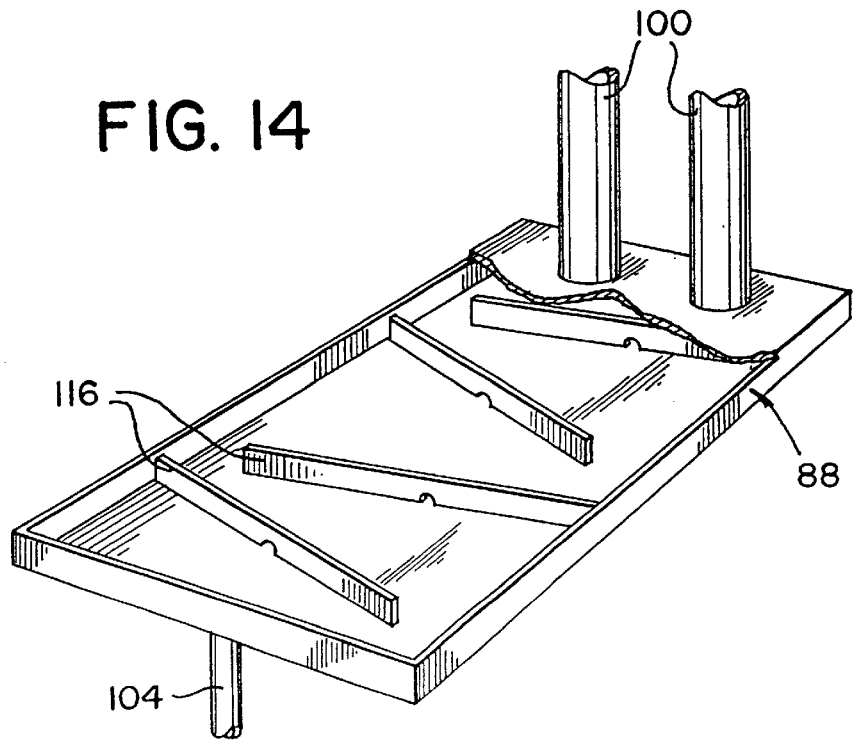

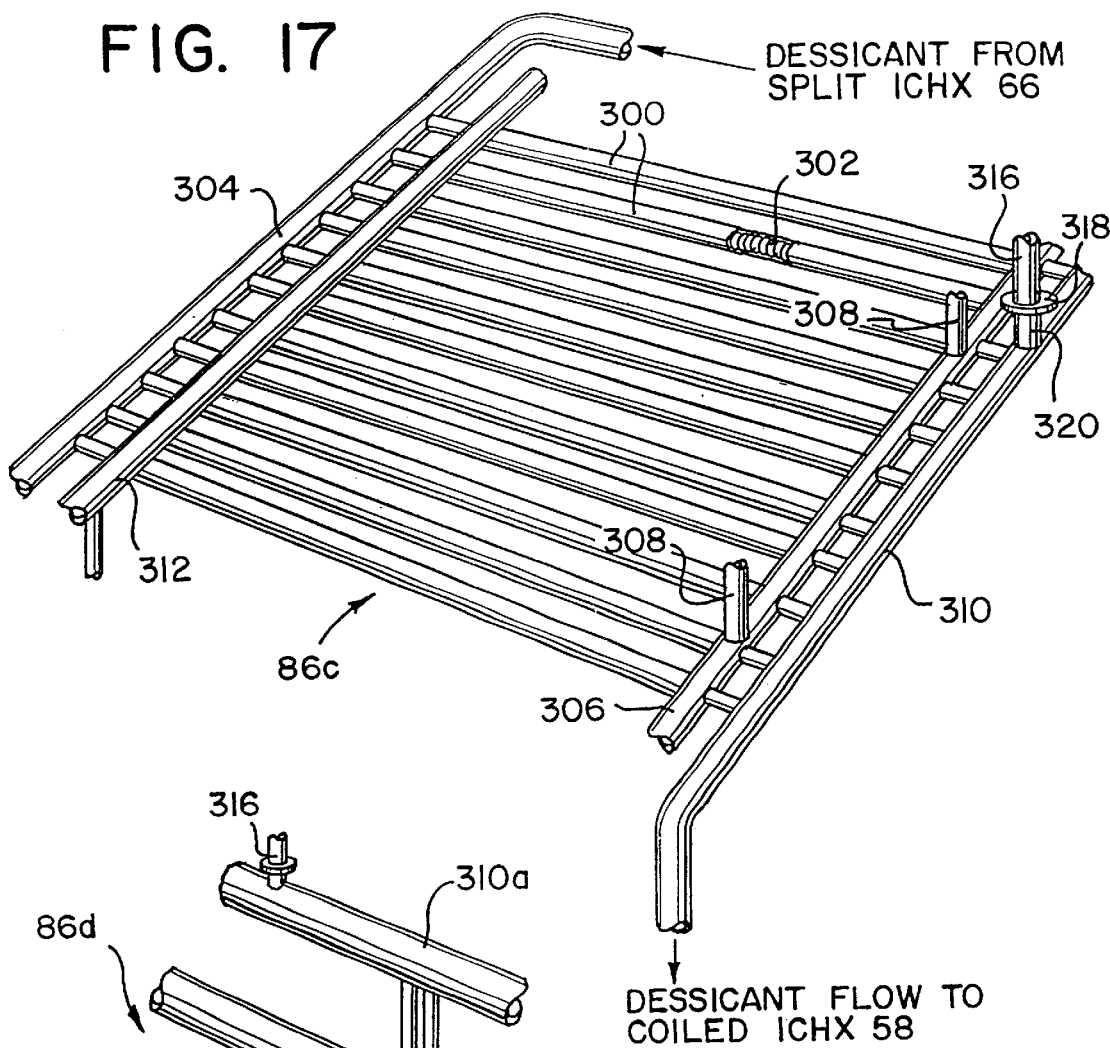
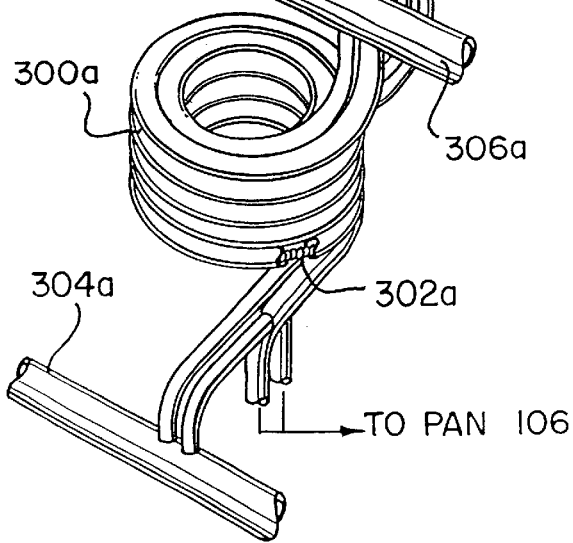
FIG. 17
FIG. 18

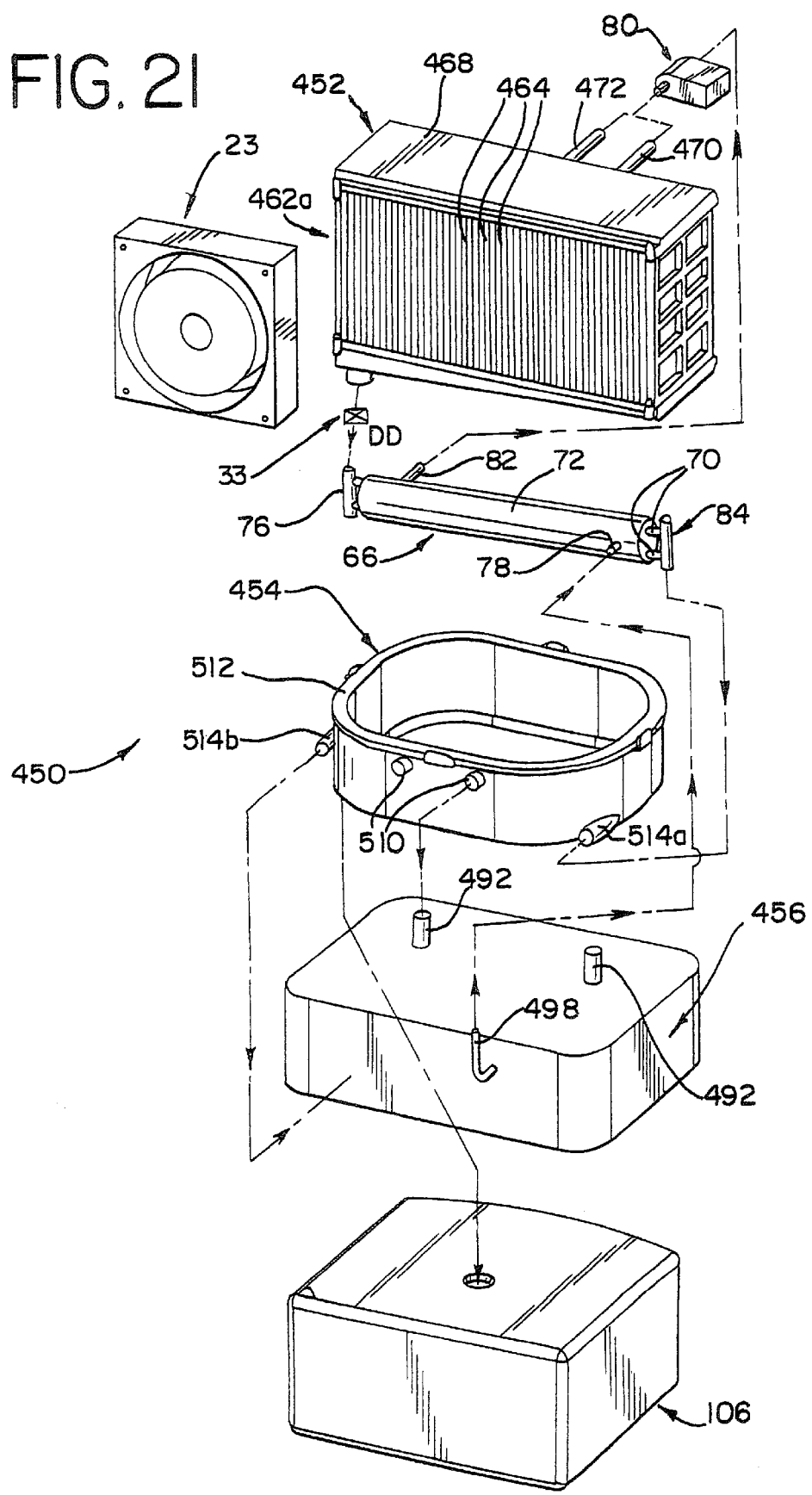

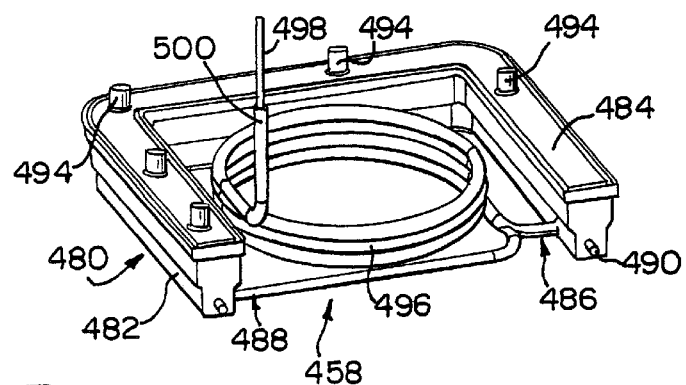
FIG. 24
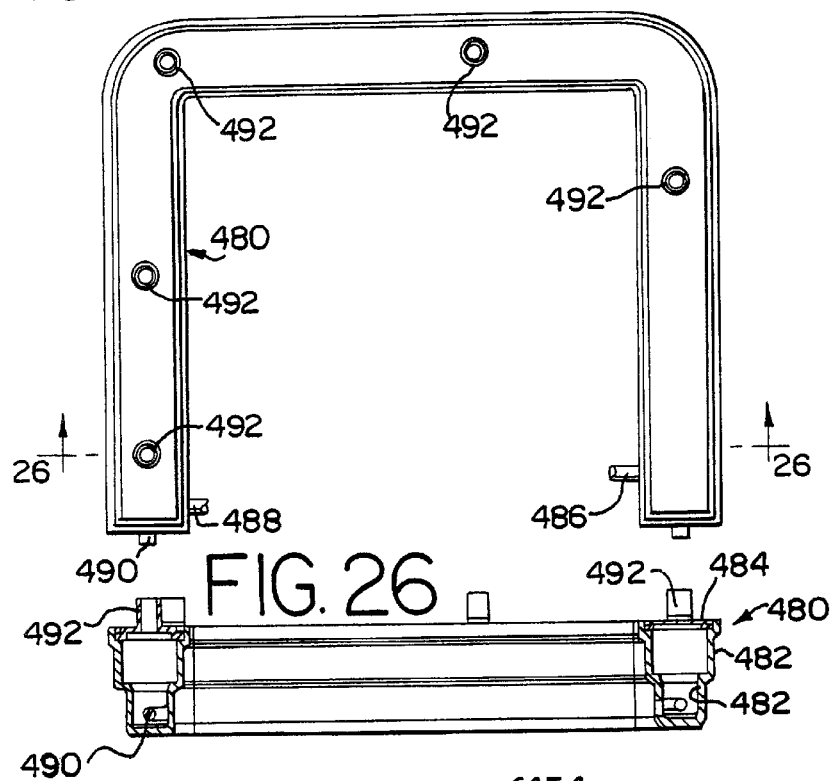
FIG. 25
FIG. 26
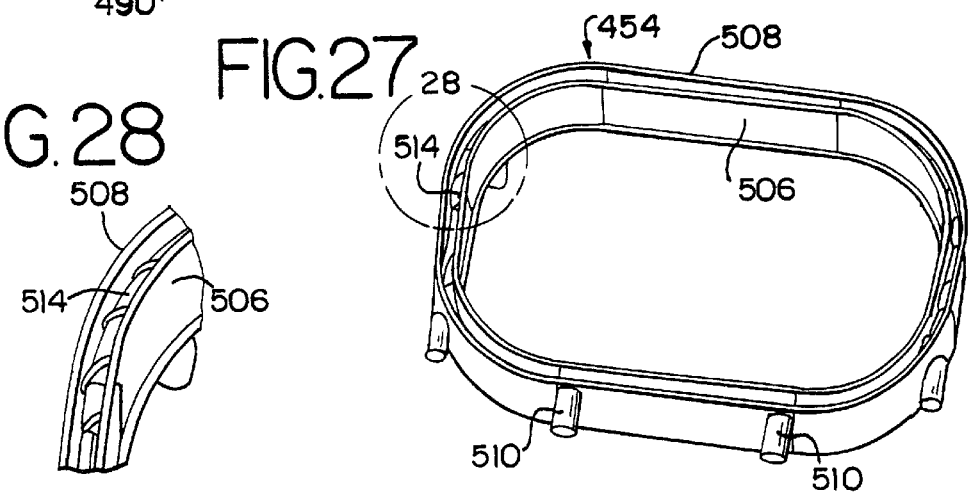
FIG. 27
FIG. 28

LIQUID DESICCANT AIR CONDITIONER

This is a continuation-in-part from application Ser. No. 09/131,287, filed Aug. 7, 1998, which is a continuation-in-part from Ser. No. 08/984,741, (U.S. Pat. No. 6,138,470) filed Dec. 4, 1997, both of which are incorporated herein by reference.

BACKGROUND

1. Field of the Invention

The present invention relates generally to room air cooling and dehumidification, and more particularly, to a liquid desiccant air conditioner including a liquid desiccant dehumidifier which is energy efficient, corrosion resistant, and capable of operation with low energy usage.

2. Description of the Prior Art

Typical air conditioning units operate on a vapor compression cycle. Over recent years, the phase out of CFC based air conditioning units has been dictated by environmental concerns. One alternative to vapor compression units, is the absorption system. The basic elements include an evaporator, condenser, absorber, pump, heat exchanger, throttle valve and regenerator. In the absorption cycle, an "absorbent" is used to absorb the refrigerant in the vaporized state after leaving the evaporator. The vaporized refrigerant is converted back into the liquid phase in the absorber. Heat released in the absorption process is rejected to cooling water passed through the absorber. A solution of absorbent and refrigerant is pumped to a regenerator, where heat is added and the more volatile refrigerant is separated from the absorbent through distillation. The refrigerant is then communicated to the condenser, expansion valve and evaporator in a conventional manner. A heat exchanger may be used for heat recovery between the absorbent returned to the absorber and the absorbent refrigerant solution delivered to the regenerator.

Absorption systems currently represent only a small percentage of commercial refrigeration systems because they are generally bulky and inefficient. However, with concerns over CFCs and ever increasing energy costs, the absorption unit has potential to provide efficient cooling by taking advantage of waste heat. This may be provided by combining such an absorption unit with a liquid desiccant dehumidifier.

It is known in the art to dehumidify ambient air using liquid desiccant systems. These devices typically utilize hygroscopic liquids such as lithium bromide (LiBr), lithium chloride (LiCI) or calcium chloride (CaC12) as the desiccant solution. In a desiccant system, the desiccant solution absorbs moisture from ambient air exposed to the solution. As the desiccant solution continues to absorb moisture, it becomes dilute and must be regenerated. In the regeneration process, the desiccant solution is heated to evaporate the excess moisture or the desiccant solution is brought into contact with a hot gas to desorb the excess moisture. In some expedients, air regenerators are used to regenerate the desiccant. These arrangements have relatively high operating costs as energy is required to provide a source of heat and to generate a suitable flow of air. In others, boiler-type regenerators are employed. However, boiler embodiments are expensive, as the corrosive nature of liquid desiccant solutions necessitates the use of costly corrosion resistant metals.

A liquid desiccant dehumidification system in which a liquid desiccant is regenerated with a boiler is described in U.S. Pat. No. 4,939,906 ("the '906 Patent"). The '906 Patent discloses a gas-fired desiccant boiler and a combined desiccant regenerator/interchange heat exchanger in which the combined regenerator/heat exchanger utilizes steam produced from the boiler to provide heat for partial regeneration. The desiccant boiler has a liquid/vapor separator chamber and then-nosyphon recirculation to reduce scale and corrosion of the boiler. Specifically, the overall system is shown in FIG. 1, wherein outdoor air is drawn into the system through an inlet duct 22, and is evaporatively cooled by a water spray 24. The cooled air is directed to a desiccant conditioner 26 to which return air is also directed through a duct 30. In the desiccant conditioner 26, the return air is contacted with a liquid desiccant solution from a sprayer 28. The desiccant liquid is disclosed as lithium calcium chloride.

This dehumidified air is then supplied to the space to be dehumidified, or it can be sensibly cooled through an evaporative cooler 32. The desiccant dehumidifies the air stream, and in the process its moisture-absorbing capability is reduced. This capability is regenerated by passing a portion of the dilute desiccant from the conditioner 26 to a first interchange heat exchanger 44 wherein the temperature of the desiccant is raised. The weakened desiccant is partially concentrated in an air-desiccant regenerator 46 in which heated air from a regeneration air heater 48 contacts the liquid desiccant. This desiccant is pumped through a second interchange heat exchanger 52 and thereafter to a desiccant boiler 56 in which regeneration of the desiccant is completed. The water vapor generated in the desiccant boiler 56 raises the temperature of the air passing through the regeneration air preheater 48. The interchange heat exchangers 44, 52 reduce the temperature of the regenerated desiccant as it returns along the pipe 60 to the conditioner 26.

The boiler 56 is depicted in FIG. 2 and operates on natural circulation, with the density of the fluid (part liquid, part vapor) in the "fired" tubes 70 being less than the density of the liquid in the outer "unfired" tube 74. A porous ceramic burner 80 facilitates combustion to provide a heat source, and hot combustion gases are blown through a combustion chamber formed by a housing 88 enclosing the fired tubes 70 so as to effect flow across fins 90 of the fired tubes 70. Weak desiccant is pumped into the fired tubes 70 through a manifold 94 which causes water in the desiccant to be vaporized. Accordingly, a density differential is created between the fluid in the fired tubes 70 and the unfired tubes 74 connected between the manifold 94 and a liquid/vapor separator 98 outside the combustion chamber housing 88. This density differential induces a natural flow of desiccant solution up the fired tubes 70 and down the unfired tubes 72. In this mainer, the natural circulation of desiccant keeps the inside walls of the fired tubes 70 coated with desiccant to thereby reduce or prevent "hot spots" from forming on the inside of the fired tubes 70 to reduce corrosion and scale build up in the fired tubes 70.

The liquid vapor separator 98 at the top of the boiler 56 separates water vapor from the concentrated liquid desiccant. A portion of the concentrated desiccant is withdrawn from the bottom of the liquid/vapor separator 98 and is returned to the desiccant conditioner 26. Water vapor flowing out of the top of the liquid/vapor separator 98 is subsequently condensed to heat air for use in an earlier regeneration step shown in FIGS. 3 and 4.

The combined regenerator/interchange heat exchanger, depicted in FIGS. 3 and 4, comprises two (2) interchange heat exchangers 44, 52, the desiccant regenerator 46 and the regeneration air heater 48. The combined desiccant regenerator/interchange heat exchanger is identified by the reference numeral 102, and is constructed by alternately stacking two (2) different corrugated plates (see FIG. 4) to define alternating flow channels. Water vapor or steam from the desiccant boiler 56 is introduced near the top of the regenerator/exchanger 102 in alternate channels (plate A). This water vapor is condensed, thereby transferring heat to the air and weak desiccant entering adjacent channels near the top of the regenerator/heat exchanger 102 (plate B). The upper portion of each plate corresponds to the desiccant regenerator 46 and regeneration air heater 48. As the water vapor condenses, the weak desiccant and air mixture is heated and the desiccant is partially regenerated. Warm air and moisture are exhausted by fan 106 to the outdoors. An entrainer 108 is provided to prevent desiccant from escaping the combined regenerator/exchanger 102. The partially regenerated desiccant flows into the middle of a channel plate B, and is further heated by the hot concentrated desiccant removed from the liquid/ vapor separator 98. Hot concentrated desiccant from the boiler 56 is introduced at the middle of plate A while the partially regenerated desiccant is removed from the middle of plate B. The partially regenerated desiccant is then pumped to the desiccant boiler 56. Diluted desiccant from the regenerator/heat exchanger 102 is introduced at the bottom of the plate A and is heated by the hot desiccant from the boiler 56. The heated dilute desiccant from the regenerator/heat exchanger 102 is then removed from the center of plate B and pumped to the top of plate B.

The apparatus shown and described in the '906 patent exhibits several disadvantages. The regeneration process described therein requires the flow of hot air through the system in order to operate. This necessitates the use of additional components such as fans, air preheaters, and liquid/vapor separators, which add system complexity. Furthermore, the multiple stacked plate interchange heat exchanger configuration is complex and takes up a relatively large amount of space.

The present invention provides an improved air cooling system comprising an absorption air conditioner operating in conjunction with a liquid desiccant dehumidifier.

SUMMARY OF THE INVENTION

One of the primary objects of the present invention to provide a liquid desiccant air conditioner which dehumidifies and cools ambient air in a combined liquid desiccant dehumidifier and refrigerant absorption cycle.

Another object of the present invention to provide a highly efficient liquid desiccant air conditioner which does not require CFCs.

Still another object of the present invention to provide a liquid desiccant air conditioner which does not require a compressor or any external heat input to effect regeneration of the refrigerant absorbent.

Still another object of the present invention to provide a liquid desiccant air conditioner which utilizes primarily plastic components to prevent corrosion.

Another object of the present invention to provide a liquid desiccant air conditioner in which steam to desiccant heat recovery takes place in a condenser, and wherein lightweight corrosion resistant components are used for the interchange heat exchangers.

A feature of the present invention lies in the provision of a liquid desiccant air conditioner in which the waste heat radiating from the boiler is utilized in an interchange heat exchanger for desiccant regeneration.

Another feature of the present invention lies in the provision of an absorber employing a plurality of stacks of desiccant absorber pads arranged to provide improved air distribution and reduce channeling or short circuiting of air flow through the absorber.

Another feature of the present invention lies in the provision of a boiler configured to provide a relatively long flow path between desiccant inlet and outlet ends so as to reduce mixing of hot concentrated desiccant with cold diluted desiccant, thereby increasing the efficiency by reducing the mass of the desiccant required to be maintained at the highest temperature in the boiler.

Still another feature of the present invention lies in the provision of a coiled condenser having sidewalls defining at least one steam flow channel, and a convoluted desiccant flow tube extending through each channel so as to achieve a high heat transfer coefficient in a compact low cost construction.

Another feature of the present invention lies in the provision of a liquid desiccant air conditioner which is lightweight, energy efficient, and inexpensive to manufacture.

In accordance with the foregoing objects and features, the present invention provides a liquid desiccant air conditioner that includes a liquid desiccant dehumidifier and an absorption air conditioner. The dehumidifier includes an absorber for absorbing moisture contained in ambient air entering the dehumidifier and passing through the desiccant absorber. The desiccant absorber constructed and arranged for receiving concentrated liquid desiccant and dispensing dilute liquid desiccant. A boiler operates to boil partially preheated dilute liquid desiccant to evaporate moisture and reconstitute the liquid desiccant into concentrated liquid desiccant. A condenser receives steam generated by the boiler, and receives dilute liquid desiccant from the absorber. The condenser sensibly heats the dilute liquid desiccant therein by recovering the latent heat of condensation as steam from the boiler is condensed, thereby increasing operating efficiency by preheating the dilute liquid desiccant prior to delivery to the boiler.

The liquid desiccant dehumidifier includes a first heat exchanger operable to transfer heat from the concentrated liquid desiccant to dilute liquid desiccant received from the desiccant absorber to raise the temperature of the dilute liquid desiccant to a first temperature. The condenser in the dehumidifier receives partially heated dilute liquid desiccant from the first heat exchanger at the first temperature. The condenser sensibly heats the dilute liquid desiccant therein to a second temperature by recovering the latent heat of condensation as steam from the boiler is condensed. A second heat exchanger in the dehumidifier communicates with the condenser, the boiler and the first heat exchanger. The second dehumidifier heat exchanger receives concentrated liquid desiccant from the boiler and receives dilute liquid desiccant from the condenser at the second temperature. The second heat exchanger raises the temperature of the dilute liquid desiccant to a third temperature after which the dilute liquid desiccant at the third temperature is passed to the boiler and the concentrated liquid desiccant from the second heat exchanger passes to the first heat exchanger. A pump effects flow of concentrated liquid desiccant into the absorber.

An evaporator is operative to cool dehumidified air received from the dehumidifier absorber. A refrigerant is vaporized in the evaporator and passes to a refrigerant absorber that contains an absorbent solution such as, for example, ammonia-water or water-lithium bromide. The refrigerant-absorber solution is pumped to a regenerator in which the refrigerant is separated from the absorbent. The regenerator receives steam from the boiler as a heat input to effect regeneration. A refrigerant condenser receives the reconstituted refrigerant from the regenerator after which the refrigerant passes through an expansion valve into the evaporator in a conventional mainer. A heat exchanger may be used in the absorption air conditioner to recover heat from the absorbent as it is returned to the refrigerant absorber so as to preheat the refrigerant-absorbent solution prior to introduction of the solution into the regenerator.

The desiccant absorber includes at least two horizontally arranged generally equal length termed stacks, of relatively closely spaced vertically disposed microglass fiber plates. The stacks are disposed in parallel spaced relation so that the plates of each row are generally coplanar with corresponding plates of the other row. A gap is provided between mutually opposed vertical marginal edges of the plate stacks. Concentrated desiccant is introduced into the desiccant absorber from a horizontal microglass fiber plate at the top of the stacks so that the desiccant wicks into the distribution plate and down the vertical fiber plates. A drain pan for collecting the dilute desiccant disposed at the bottom of the desiccant absorber. Ambient air is drawn through the absorber so as to contact the exposed faces of the plates. The air mixes as it passes through the gap between the stacks so as to improve air distribution and reduce channeling or short circuitry with an improvement in the distribution of mass transfer driving force and an increase in mass transfer coefficient to increase the absorption capacity.

The various components are disposed with respect to one another to take advantage of gravity feed to communicate the liquid desiccant from the absorber to the boiler via the first and second heat exchangers and the condenser, thereby eliminating the need for multiple pumps in the system.

BRIEF DESCRIPTION OF THE DRAWINGS

In accordance with the above, the present invention will now be described in detail with particular reference to the accompanying drawings.

FIG. 9B is a side elevational view of a desiccant absorber in accordance with another embodiment;

FIG. 9C is a detail view of the absorber pads;

FIG. 10 is an isometric view of a boiler;

FIG. 13 is an isometric cut-away view of a condenser in a first embodiment;

FIG. 14 is an isometric cut-away view of an inner shell of the condenser shown in FIG. 13;

FIG. 17 is an isometric view of a condenser in a fourth embodiment;

FIG. 18 is an isometric view of a condenser is a fifth embodiment;

FIG. 21 is an exploded perspective view of an alternative embodiment of a liquid desiccant dehumidifier in accordance with the present invention;

FIG. 24 is a perspective view of the boiler and associated interchange heat exchanger of FIG. 21 but with the outer shell or housing removed for clarity;

FIG. 25 is a plan view of the boiler and associated coil interchange heat exchanger illustrated in FIG. 24, portions being broken away for clarity;

FIG. 26 is a transverse sectional line taken substantially along line 26—26 of FIG. 25;

FIG. 27 is a perspective view of the coiled condenser of FIG. 21 with the top plate removed to show the internal convoluted tube through which desiccant is passed; and FIG. 28 is an enlarged detail view, taken within the line 28—28 of FIG. 27.

DETAILED DESCRIPTION

Figure 1:
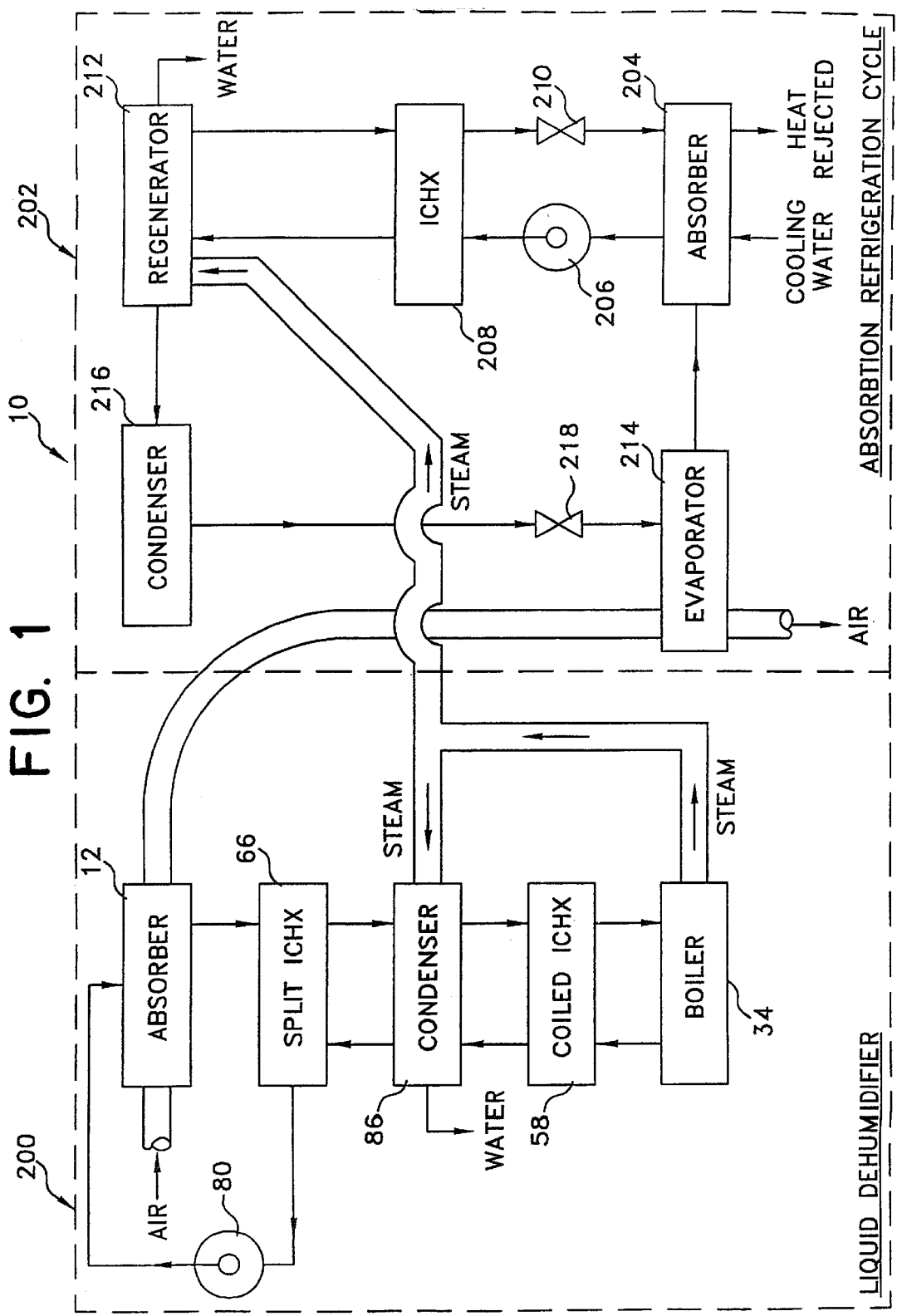
FIG. 1 is a schematic of a first embodiment of a liquid desiccant air conditioner in accordance with the present invention.

Referring now to the drawings, FIGS. 1–7 schematically illustrate various embodiments of a liquid desiccant air conditioner ("LDA"), generally characterized by the reference numeral 10.

FIG. 1 is a schematic diagram of a first embodiment of the LDA 10 that includes a liquid desiccant dehumidifier 200 and an absorption air conditioner 202. The liquid desiccant dehumidifier 200 illustrated in FIG. 8 includes an absorber 12, a condenser, 86, and a boiler 34. An interchange heat exchanger 58 is disposed between boiler 34 and condenser 86, and a split interchange heat exchanger 66 is disposed between condenser 86 and absorber 12.

The liquid desiccant dehumidifier 200 dehumidifies incoming ambient air prior to effecting sensible cooling of the air in the absorption air conditioner 202. The absorption cycle employs waste heat generated by the boiler 34 of liquid desiccant dehumidifier 200 for energy efficient cooling and dehumidification. The air conditioner 202 operates on a conventional absorption cycle, and includes an absorber 204, a pump 206, a heat exchanger 208, a throttle valve 210, a regenerator 212, an evaporator 214, a condenser 216, and an expansion valve 218. In the absorption cycle, an absorbent, such as aqueous ammonia or aqueous lithium bromide, is used to absorb refrigerant in the vaporized state after leaving evaporator 214. The vaporized refrigerant is absorbed back into the liquid phase in absorber 204. Heat released in the absorption process is rejected to cooling water or air passed through absorber 204. A solution of absorbent and refrigerant is pumped to regenerator 212, where heat is added and the more volatile refrigerant is separated from the absorbent. The refrigerant is then communicated to condenser 216, through expansion valve 218 and into the evaporator 214 in a conventional manner. A heat exchanger 208 may be used for heat recovery between the warm absorbent returned to the absorber 204 through throttle valve 210, and the absorbent-refrigerant solution delivered from the absorber 204 to the regenerator 212 via pump 206. The regenerator 212 fluidly communicates with boiler 34 to receive steam generated in reconstituting the liquid desiccant as described below. In this mangler, no external heat input is required to regenerate the refrigerant. The heat exchanger 208 can be configured as described below with respect to interchange heat exchanger 66 of the liquid desiccant dehumidifier 200.

Figure 2A:
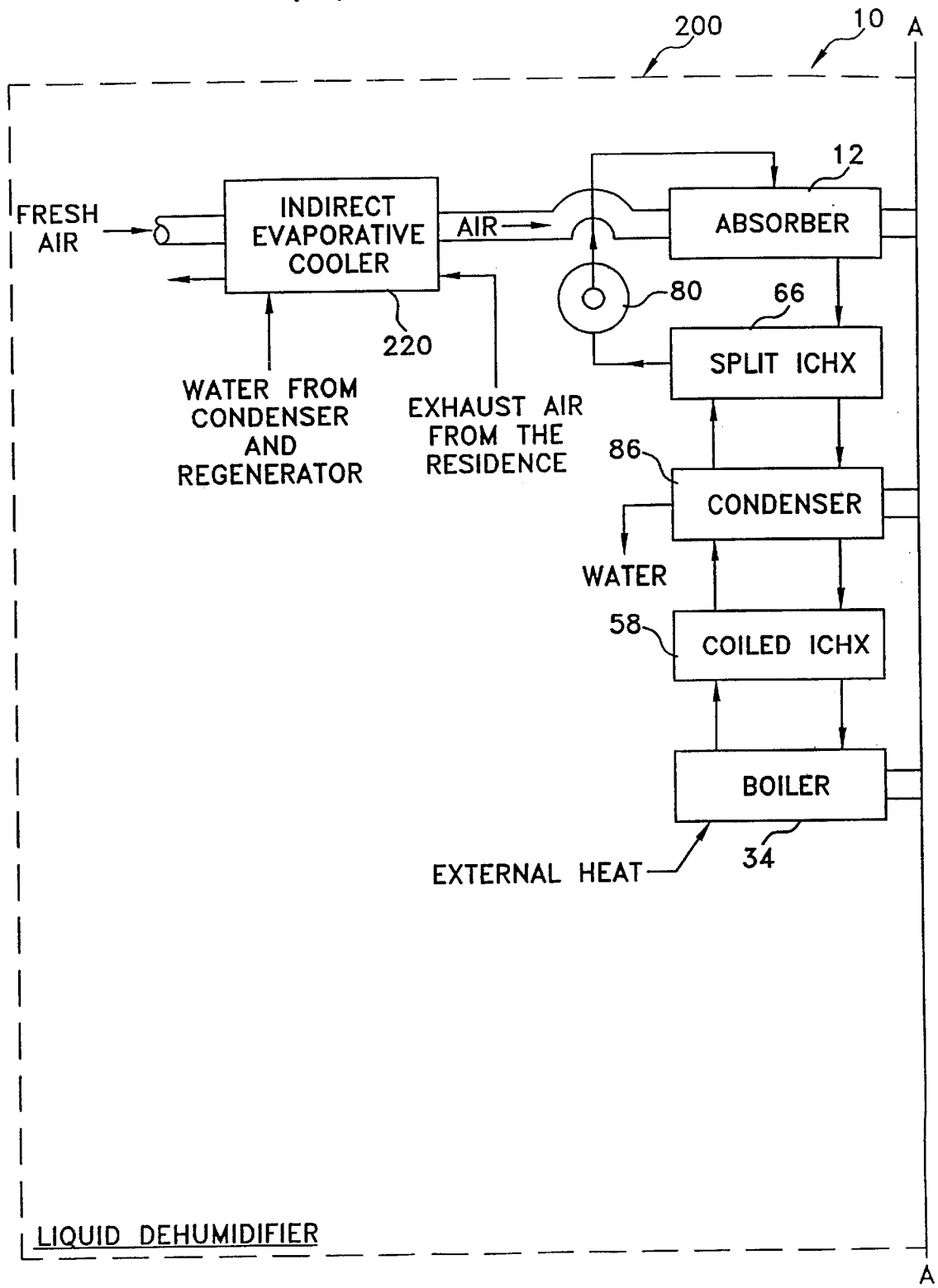
FIG. 2 is a schematic of a second embodiment of a liquid desiccant air conditioner in accordance with the present invention.
Figure 2B:
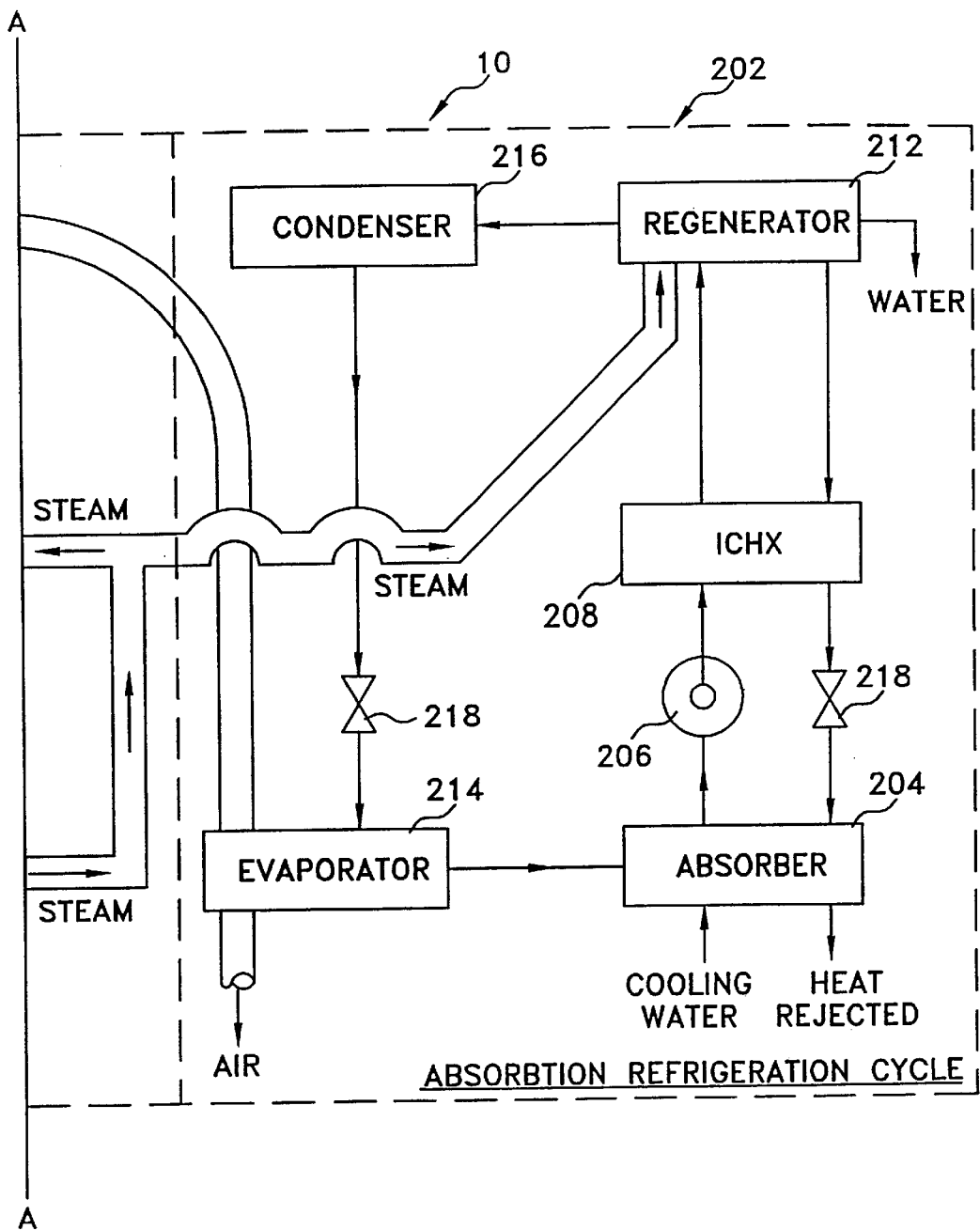

FIG. 2 is a schematic diagram illustrating a second embodiment of the LDA 10 which adds an indirect evaporative cooler 220 for cooling the incoming air with exhaust air from the residence prior to passing the incoming air through the desiccant absorber 12. The indirect evaporator cooler 220 receives a water supply from condenser 86 and regenerator 212. Fresh air is directed into the cooler 220 from the ambient, cooled, and thereafter delivered to desiccant absorber 12. The remainder of the cycle operates as described in respect to the embodiment of FIG. 1.

Figure 3A:
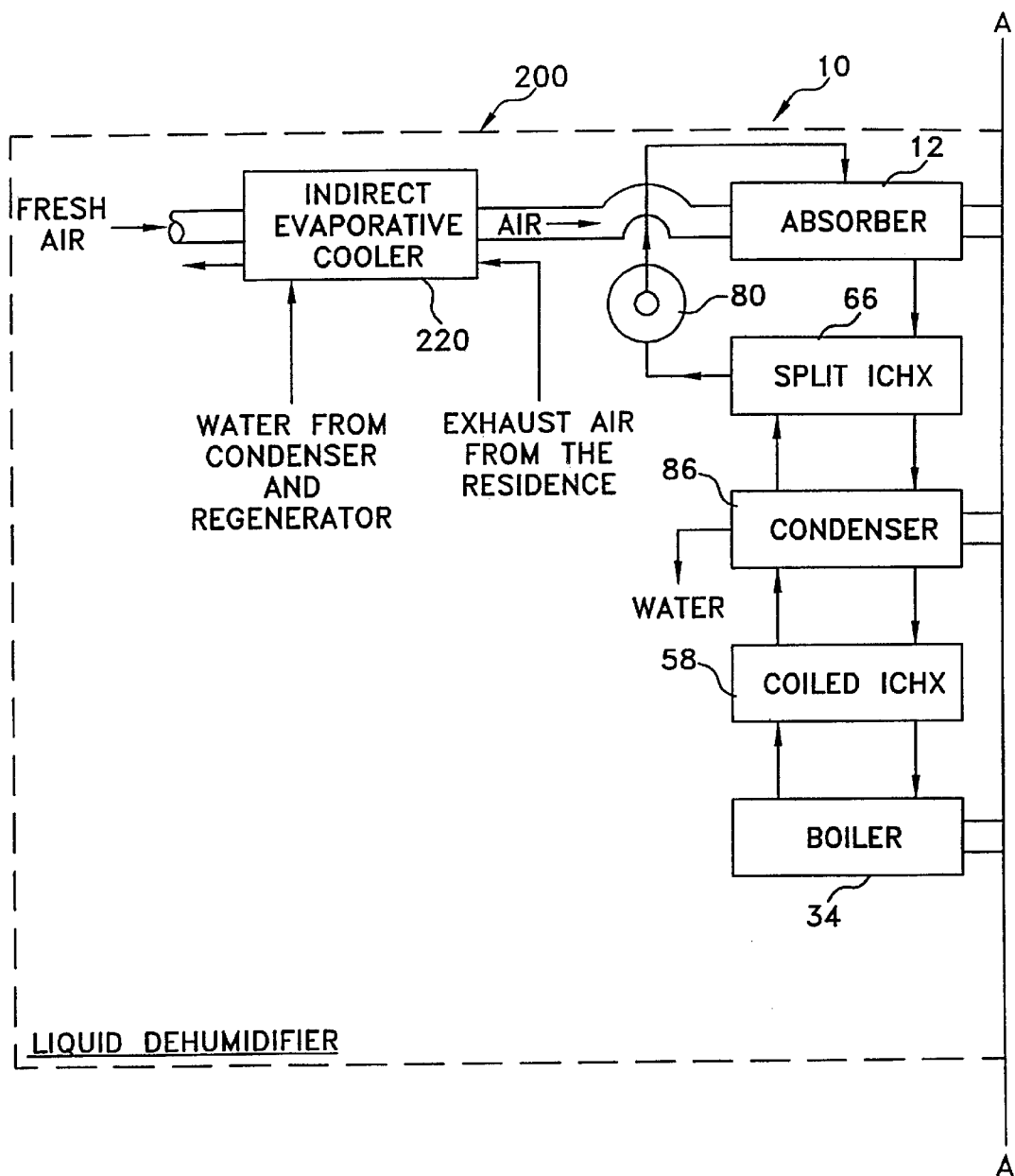
FIG. 3 is a schematic of a third embodiment of a liquid desiccant air conditioner in accordance with the present invention.
Figure 4A:
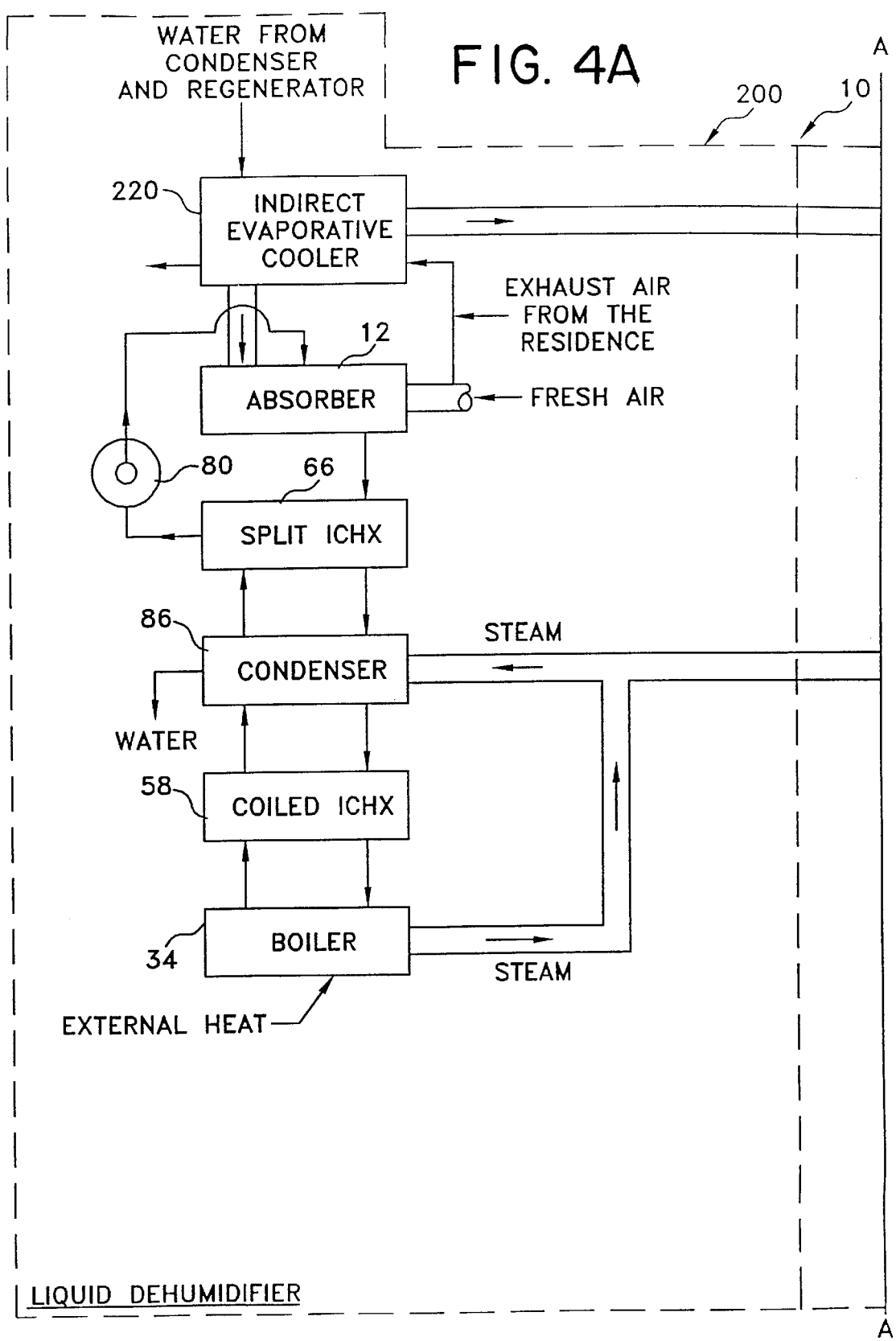
FIG. 4 is a schematic of a fourth embodiment of a liquid desiccant air conditioner in accordance with the present invention.
Figure 5B:
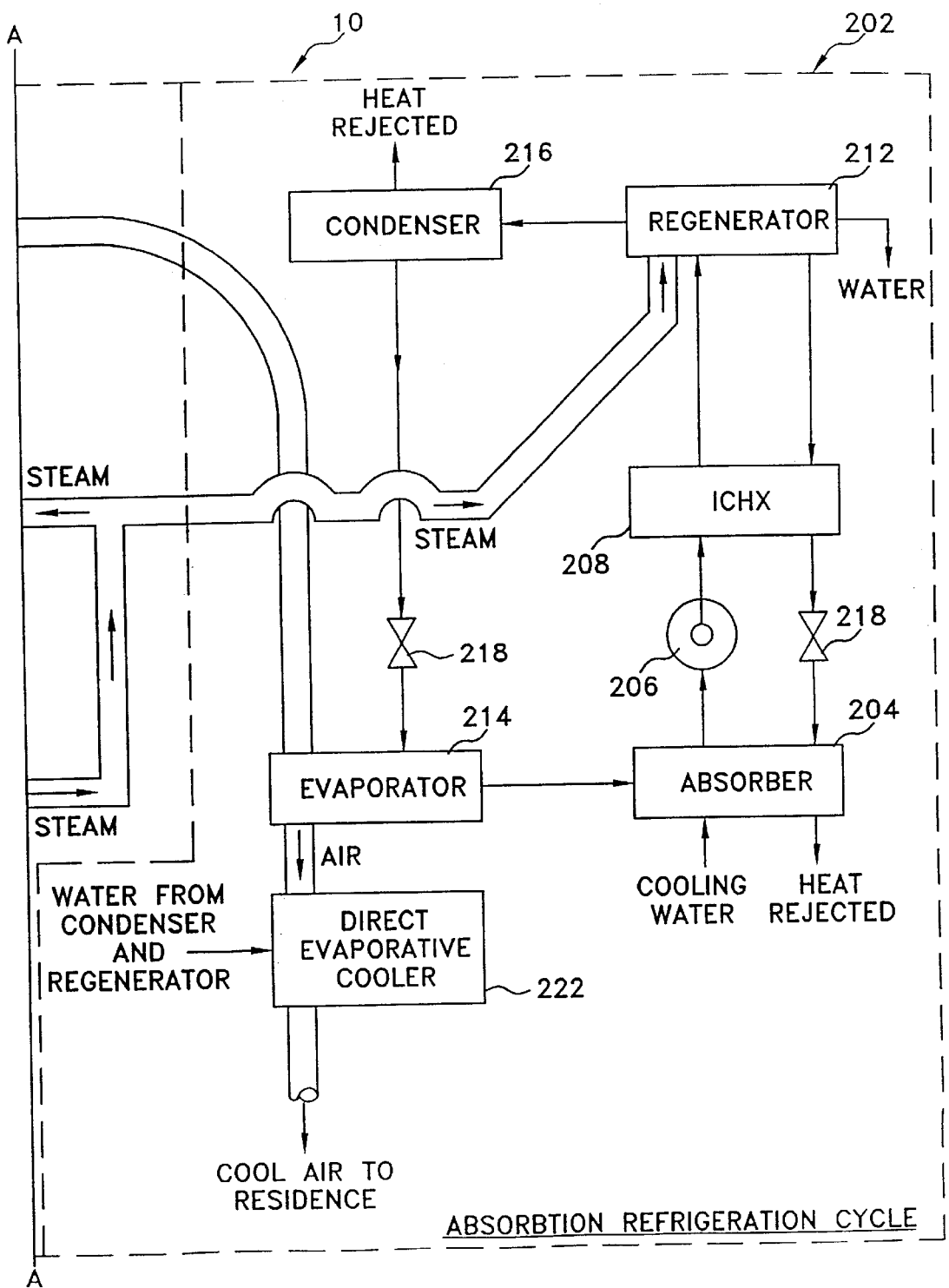
FIG. 5 is a schematic of a fifth embodiment of a liquid desiccant air conditioner in accordance with the present invention.

FIG. 3 is a schematic diagram illustrating a third embodiment of the LDA 10 which adds a direct evaporative cooler 222 to the embodiment of FIG. 2. The direct evaporative cooler 222 is operative to further cool the air prior to delivery to the ambient. Water is supplied to cooler 222 from condenser 86 and regenerator 212. FIG. 4 schematically illustrates a fourth embodiment of the LDA 10 in which the ambient air is first directed into the absorber 12 for dehumidification, and then into the indirect evaporative cooler 220 for cooling. FIG. 5 is a schematic diagram illustrating a fifth embodiment of the LDA 10 which is similar to that shown in FIG. 1, but adds the direct evaporative cooler 222.

Figure 6:
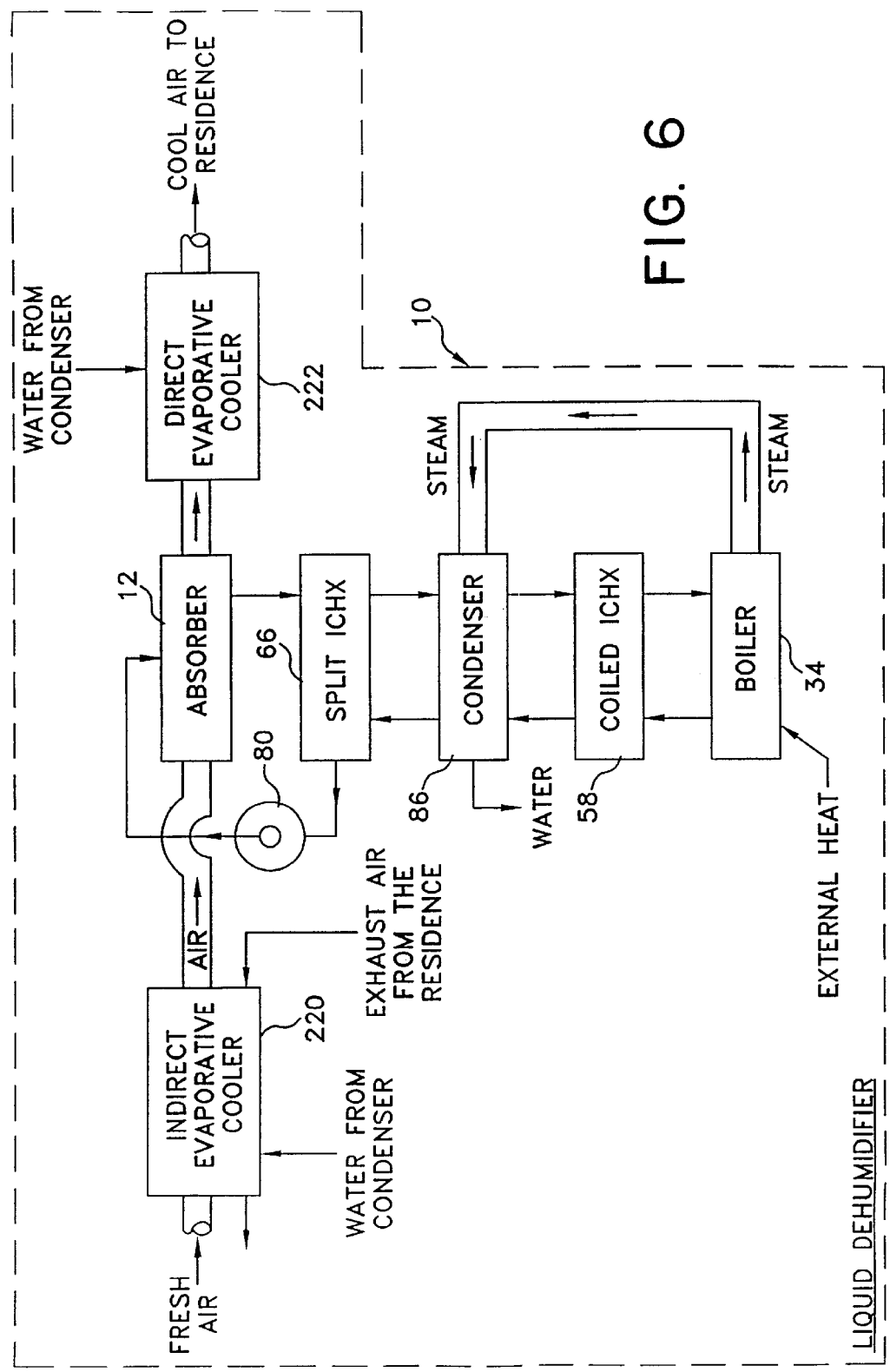
FIG. 6 is a schematic of a sixth embodiment of a liquid desiccant air conditioner in accordance with the present invention.
Figure 7:
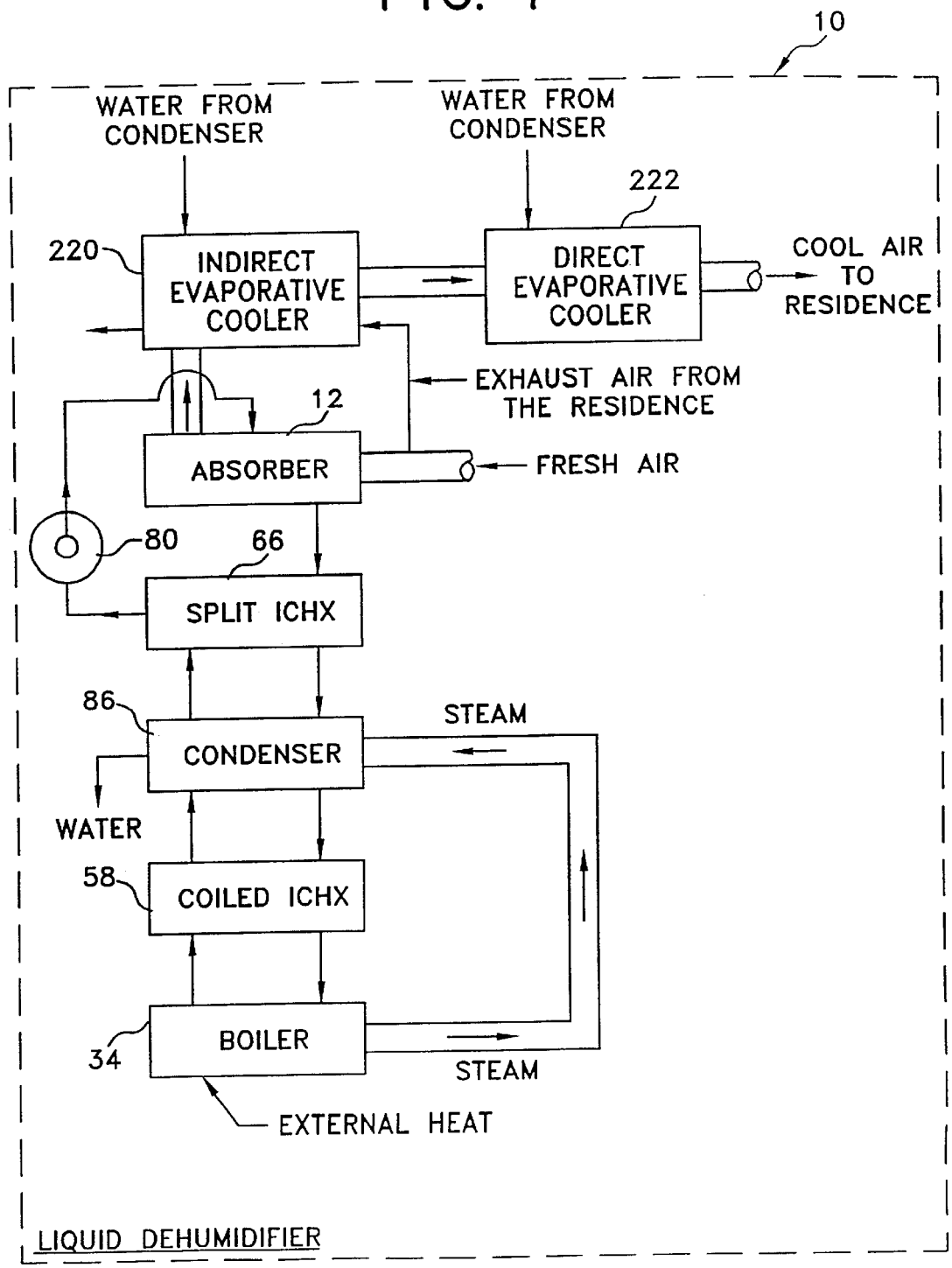
FIG. 7 is a schematic of a seventh embodiment of a liquid desiccant air conditioner in accordance with the present invention.

FIG. 6 schematically illustrates a sixth embodiment of the LDA 10 which does not utilize a refrigerant. In this expedient, the LDA 10 cooperates with an indirect evaporative cooler 220 and a direct evaporative cooler 222 to cool and dehumidify the incoming air. The air is directed through indirect evaporative cooler 220, cooled, and thereafter delivered to the desiccant absorber 12. The dehumidified air is then passed through the direct evaporative cooler 222 where it is further cooled by sensible cooling and exhausted to the ambient. The principle of operation is generally the same as described in respect to the embodiments of FIGS. 1–5. Water from condenser 86 is delivered to indirect evaporative cooler 220 and direct evaporative cooler 222. Exhaust air from the residence is communicated to the indirect evaporative cooler 220. FIG. 7 is a schematic diagram illustrating a seventh embodiment of the LDA 10 which is similar to that shown in FIG. 6 and described above, except that the incoming ambient air is first dehumidified in the desiccant absorber 12 and thereafter cooled in the indirect evaporative cooler 220.

Figure 8:
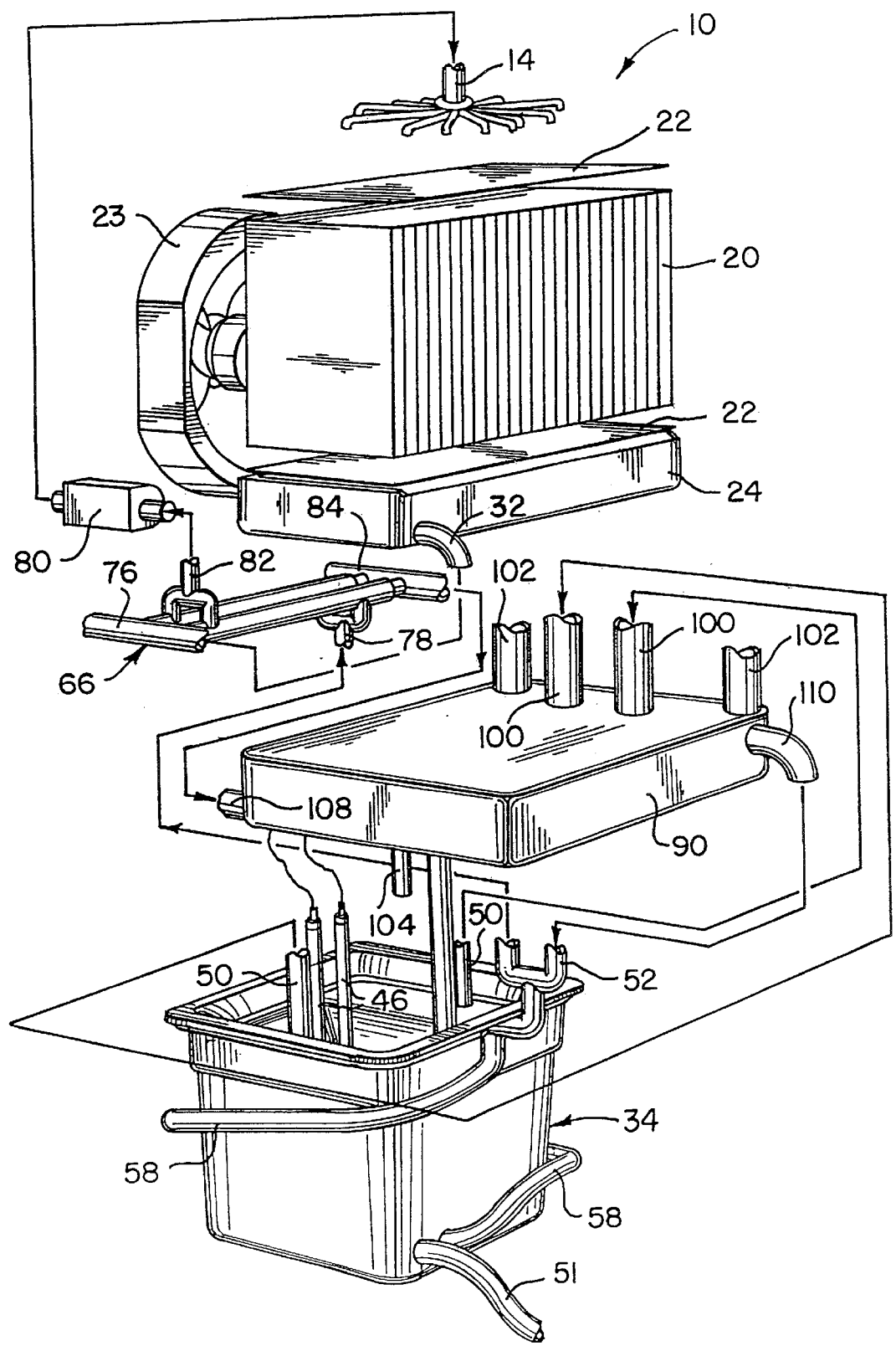
FIG. 8 is an exploded isometric view of the portable liquid desiccant dehumidifier in accordance with the present invention.
Figure 8A:
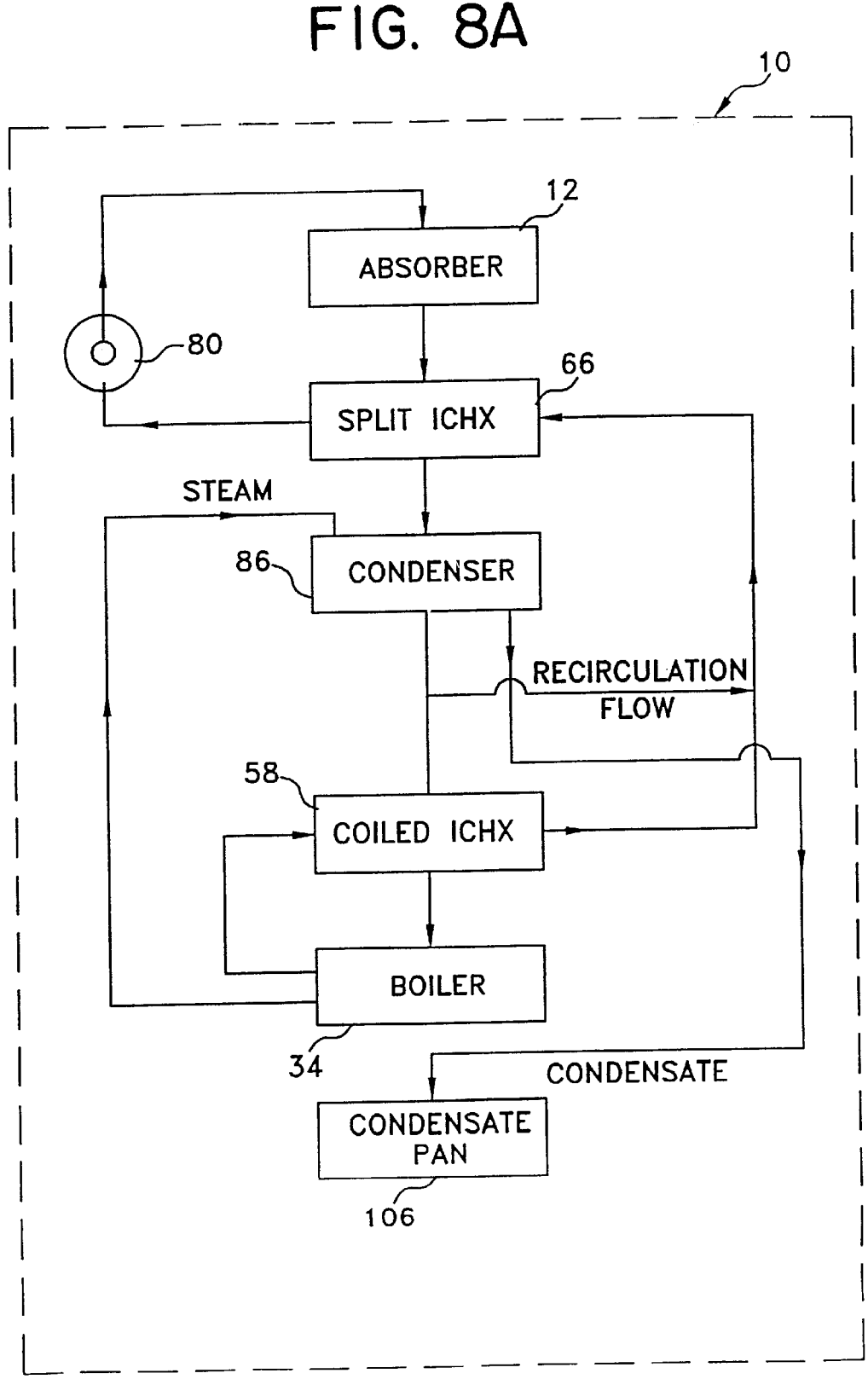
FIG. 8A is a block diagram depicting the general operation of the liquid desiccant dehumidifier.
Figure 9A:
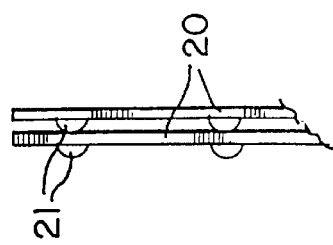
FIG. 9A is a detail view of the microglass fiber plates in the absorber.
Figure 9:
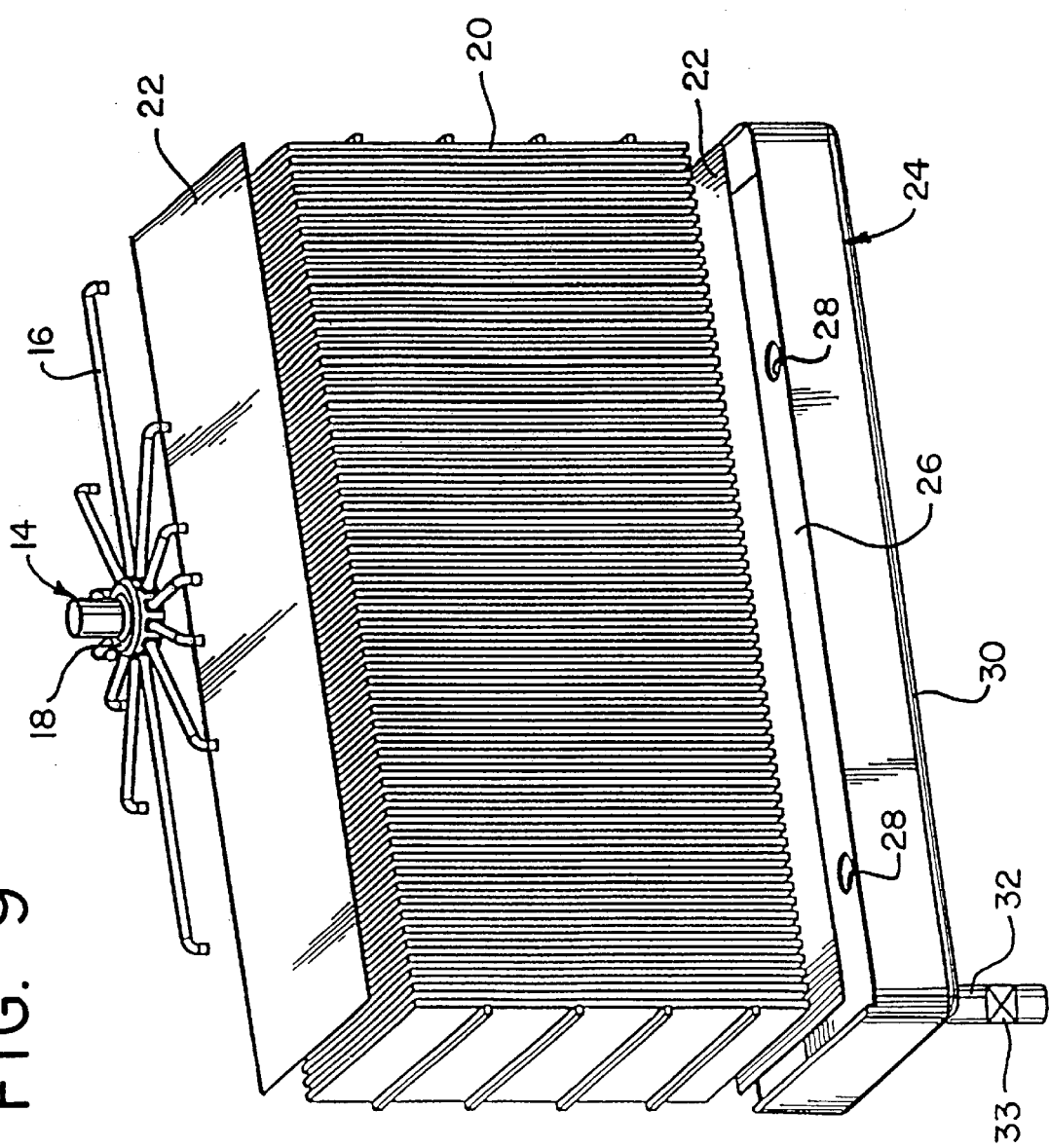
FIG. 9 is an exploded isometric view of a desiccant absorber assembly.
Figure 19:
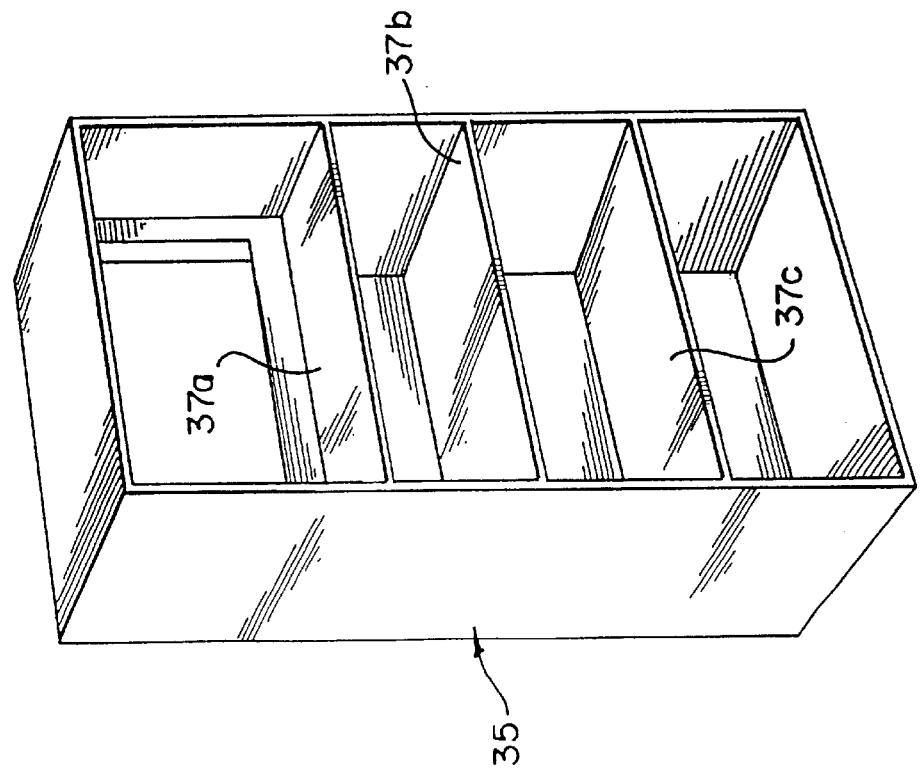
FIG. 19 is an isometric cut-away view of a frame for housing the respective components of the system.

Referring now to FIGS. 8 and 8A, the desiccant dehumidifier section 200 includes liquid desiccant absorber 12 for absorbing moisture contained in air entering air conditioner and passing through desiccant absorber 12. The desiccant absorber 12 is constructed and arranged for receiving concentrated liquid desiccant at the top of desiccant absorber 12 and dispensing dilute liquid desiccant from the bottom of desiccant absorber 12. The desiccant solution may be any one of several conventional solutions, including aqueous LiBr, LiCl or CaCl, as described above, or any mixture of these solutions. Referring to FIGS. 9 and 9A, desiccant absorber 12 includes a distributor 14 disposed at the top of desiccant absorber 12 which receives concentrated liquid desiccant and delivers the liquid desiccant through a plurality of "spaghetti" tubes 16 extending radially outward from a central hub 18. The desiccant absorber 12 includes a plurality of horizontally and vertically disposed interconnected microglass fiber plates. The vertical plates are identified by reference numeral 20, and are supported by horizontal interconnecting fiber plates 22 as shown. The top plate 22 is referred to as a distribution sheet. The concentrated desiccant wicks into the distribution sheet 22 and down the vertical plates 20. The vertical plates 20 contain beads 21 which separate and support adjacent vertical plates 20. Ambient air is drawn into the unit and forced through the microglass fiber plates by a fan 23 (FIG. 8) so that moisture in the air is removed as the air makes contact with the liquid desiccant. As the desiccant dehumidifies the air stream, the moisture-absorbing capability of the desiccant is reduced and the desiccant must be regenerated. The dilute desiccant is collected in a drain pan 24 disposed at the bottom of desiccant absorber 12. The drain pan 24 includes an intermediate support plate 26 defining at least one drain hole 28 which enables the dilute desiccant to flow into a bottom chamber defined between support plate 26 and a bottom wall 30 of drain pan 24. A drain tube 32 including a one-way or check valve 33 extends from the bottom chamber to direct the dilute desiccant out of absorber 12. The absorber components are disposed within a frame 35 as shown in FIG. 19, which can be fabricated from materials including, but not limited to, polypropylene, polyethylene, polytetrafluoroethyline, which is commercially available under the tradename TEFLON and will hereinafter referred to under its tradename polyvinylidene fluoride, polycarbonate, PVC or polystyrene. The frame 35 includes a plurality of shelves 37a, 37b, and 37c for supporting the respective components of the unit described below.

Figure 9D:
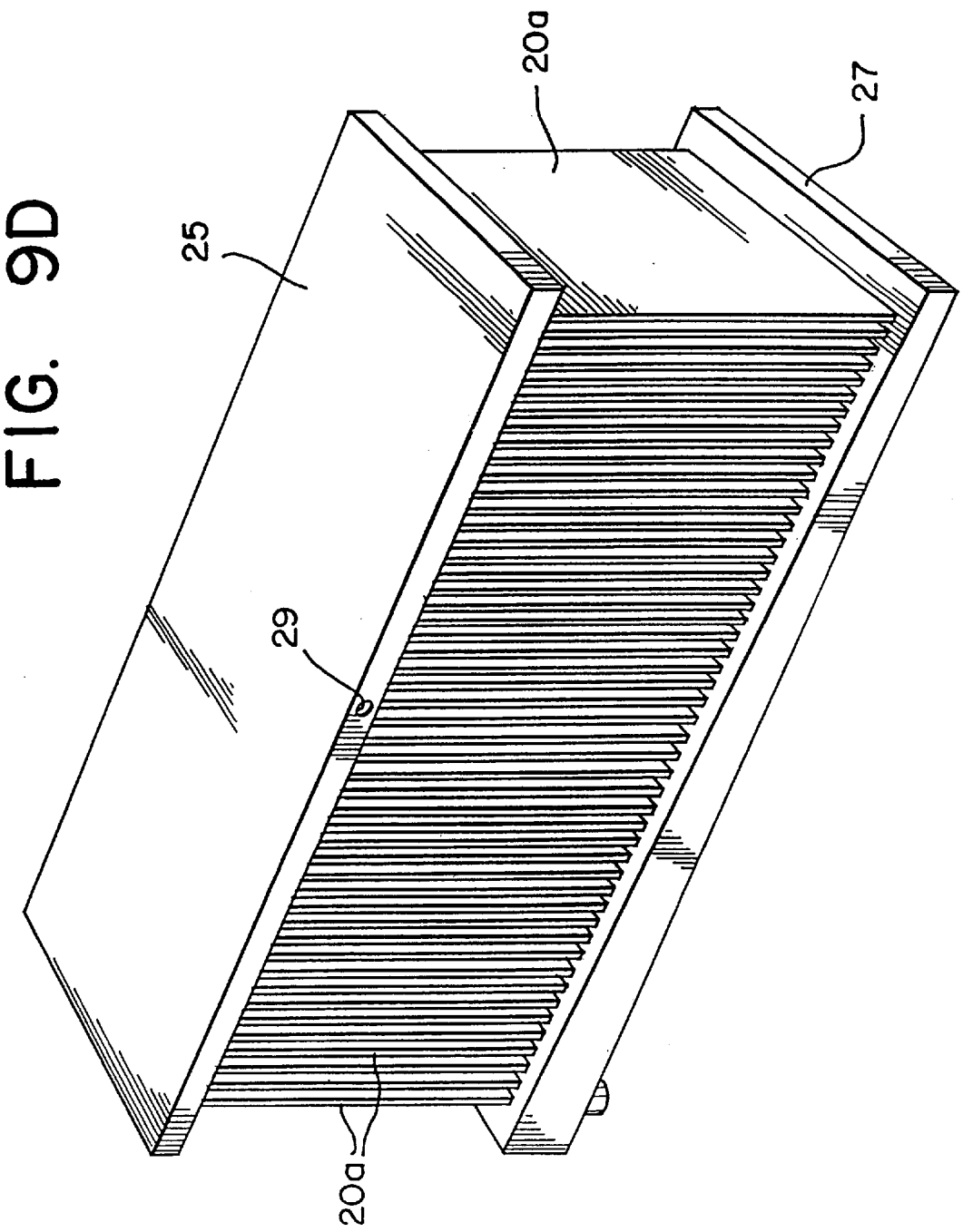
FIG. 9D is an isometric view of the desiccant absorber of FIG. 9B.

In an alternative embodiment of the absorber shown in FIGS. 9B–9D, a plurality of absorber pads 20a are stacked side-by-side and bonded together at the ends with an adhesive "A" (or taped) so that the gaps between the pads 20a are completely sealed to force the liquid desiccant to wick through the pads 20a. The pads 20a are received in an aperture or slots in a top tray or distributor pan 25 and a bottom tray or drain pan 27. Any gaps between the pads 20a and the pans 25, 27 may be filled with an RTV silicone sealant or like material. Liquid desiccant is communicated into the distributor pan 25 through an inlet 29. This configuration prevents the liquid desiccant from just flowing over the surface of the pads, and consequently increases absorber efficiency. The trays 25, 27 effectively prevent spillage of liquid desiccant from the absorber 12 in the event of tilting. In addition, the liquid desiccant supplied to the distributor pan 25 forms a thin film on the pan surfaces to reach every distributor pad 20a to improve desiccant distribution.

The dilute liquid desiccant is regenerated into concentrated desiccant by boiling the liquid desiccant in a boiler 34 at a temperature in the range of from approximately 260° F. to 320° F. An improvement over prior art systems resides in the use of steam to directly preheat the dilute liquid desiccant. The dilute liquid desiccant is thus passed through a condenser and preheated using the latent heat of condensation of the steam produced by boiling the liquid desiccant. Preferably, a series of interchange heat exchangers are employed to further preheat the dilute liquid desiccant entering the boiler 34 by recovering heat from the concentrated liquid desiccant delivered to absorber 12 from boiler 34 to further increase operating efficiency. These components are described in more detail below.

Referring to FIG. 10, the boiler 34 is configured in the shape of a tub or vessel having an elongated horizontal dimension. The horizontal elongation provides a uniform temperature gradient, and thus a uniform concentration level of the liquid desiccant solution, as compared to a vertically elongated boiler. The boiler 34 includes side walls 36, a bottom wall 38, a top wall 40, and a peripheral support flange 42. The boiler 34 is constructed from materials including, but not limited to, polycarbonate, polyvinylidene fluoride, TEFLON, fiber glass and the like. A heating element 44 is coiled proximal to the bottom wall 38 as shown, and is connected to a pair of leads 46 in a conventional manner. A thermocouple 48 extends into boiler 34 to monitor the internal temperature. The leads 46 and thermocouple 48 extend through top wall 40. The heating element 44 and thermocouple 48 are operably associated with a controller (not shown) for maintaining boiler 34 at the optimum temperature. A pair of steam outlets 50 extend through top wall 40 to deliver steam generated by boiling the liquid desiccant to a condenser described in more detail below.

Figure 11:
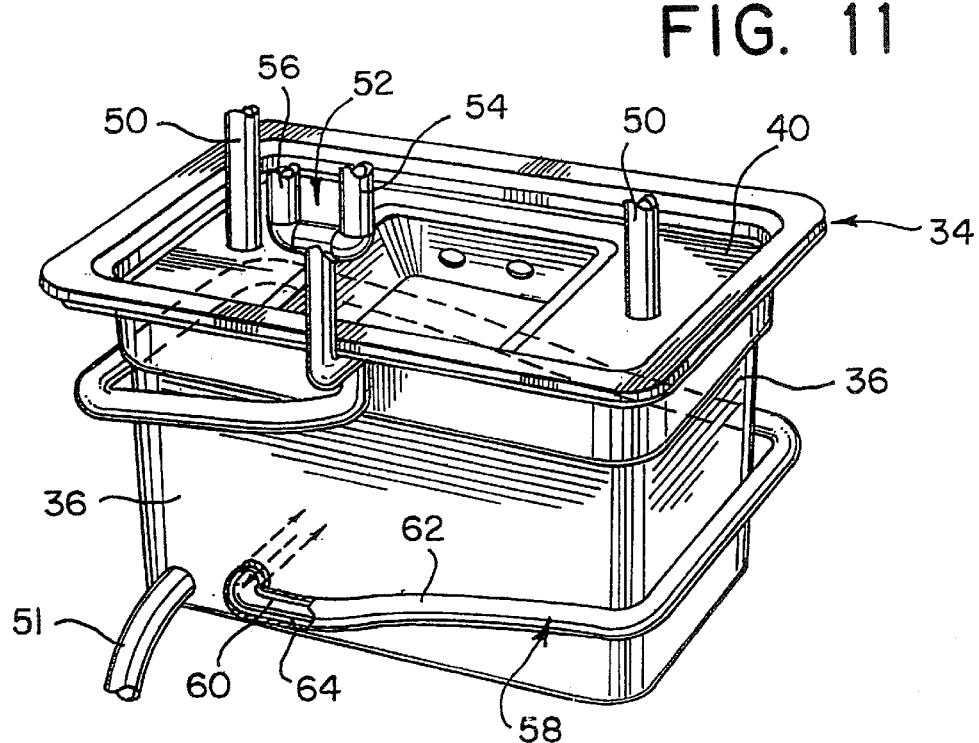
FIG. 11 is an isometric view of a coiled interchange heat exchanger and the boiler.

Referring to FIG. 11, a drain tube 51 is coupled to one of the side walls 36 to enable boiler 34 to be emptied as required. A U-fitting 52 is coupled to the upper region of one of the side walls 36 to receive preheated dilute liquid desiccant from the condenser through an inlet port 54, and to dispense concentrated liquid desiccant through an outlet port 56. The U-fitting 52 communicates with a coiled interchange heat exchanger 58, which comprises at least one tube assembly including an inner tube 60 concentrically disposed within an outer tube 62 to define an annulus 64 therebetween. The tube assembly is coiled around boiler 34 to recover the waste heat radiating through side walls 36. This arrangement is exemplary, as the tube assembly could be embedded within the side walls 36, or disposed in contact with top wall 40. The concentrated liquid desiccant from boiler 34 enters the annulus 64 through side wall 36 and is directed to outlet port 56. The partially heated dilute liquid desiccant from the condenser is passed through the inner tube 60 in a direction counter to the concentrated liquid desiccant and enters boiler 34 through side wall 36. Alternatively, the concentrated liquid desiccant is passed through inner tube 60 and the dilute liquid desiccant is passed through annulus 64. The inner tube 60 is preferably fabricated from TEFLON and outer tube 62 is constructed from silicone rubber. The TEFLON inner tube 60 has relatively high heat conductivity, while the outer silicone rubber tube 62 has a relatively low thermal conductivity and is a good insulator. These components can withstand relatively high temperatures (–400° F.), and are not corroded by the desiccant solution. To improve efficiency, inner tube 60 may be convoluted as shown in FIG. 12A or corrugated as shown in FIG. 12B. It will be understood that the use of this type of TEFLON/silicone rubber tube-in-tube heat exchanger is not limited to a liquid desiccant system. There are many applications in which this arrangement may be employed. The particular operation of the coiled interchange heat exchanger 58 will be described in more detail below.

Figure 11A:
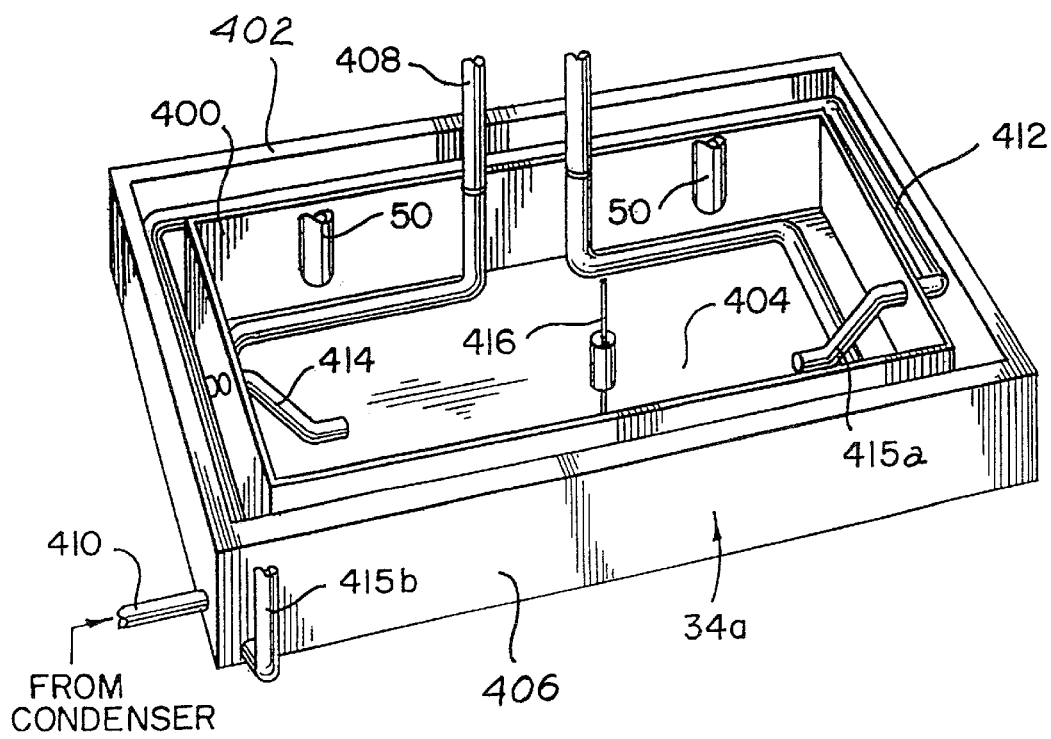
FIG. 11A is an isometric view of a boiler in an alternative embodiment.

FIG. 11A is an isometric view of a boiler 34a in an alternative embodiment, having a double-wall configuration including an inner wall 400 and an outer wall 402 which define an inner vessel 404 and an outer vessel 406. A heating element 408 extends into the inner vessel 404 and around the floor as shown. The incoming liquid desiccant from condenser 86 enters the outer vessel 406 of the boiler at inlet 410. Hot liquid desiccant from the inner vessel 404 is communicated into pipe 412 which coils through the outer vessel 406 to effect heat transfer with the incoming liquid desiccant. The desiccant puddle contained in the outer vessel 406 is heated and the hottest portion of the liquid is forced to rise to the top of the vessel 406. It is then fed into the inner vessel 404 via an inlet 414. A thermocouple 416 is disposed in the inner vessel 404 as described above to control the boiler temperature. This arrangement forces any heat radiated or conducted from the inner vessel 404 to flow through the desiccant puddle in the outer vessel 406, thereby reducing thermal losses and pressure losses attributable to long flow paths. The heating element 408 is disposed below the pump suction or inner vessel boiler outlet 415a so that heating element 408 is always immersed in a pool of liquid desiccant within the inner vessel 404. In this manner, the pump 80 stops drawing liquid desiccant from inner vessel 404 before it is reduced to a level beneath the heating element 408. Hot liquid desiccant leaves the boiler through outlet 415b. This arrangement eliminates the need for a low-level control switch. High level control in the boiler is necessary to provide consistent dehumidification and to prevent excess liquid buildup. A high level control switch can be eliminated by sizing the inner vessel 404 with an internal volume equal to approximately twice the volume of pooled liquid desiccant accumulation. This takes advantage of the inherent desiccant properties to make the system flexible to adapt to varying weather conditions without compromising performance.

Figure 12:
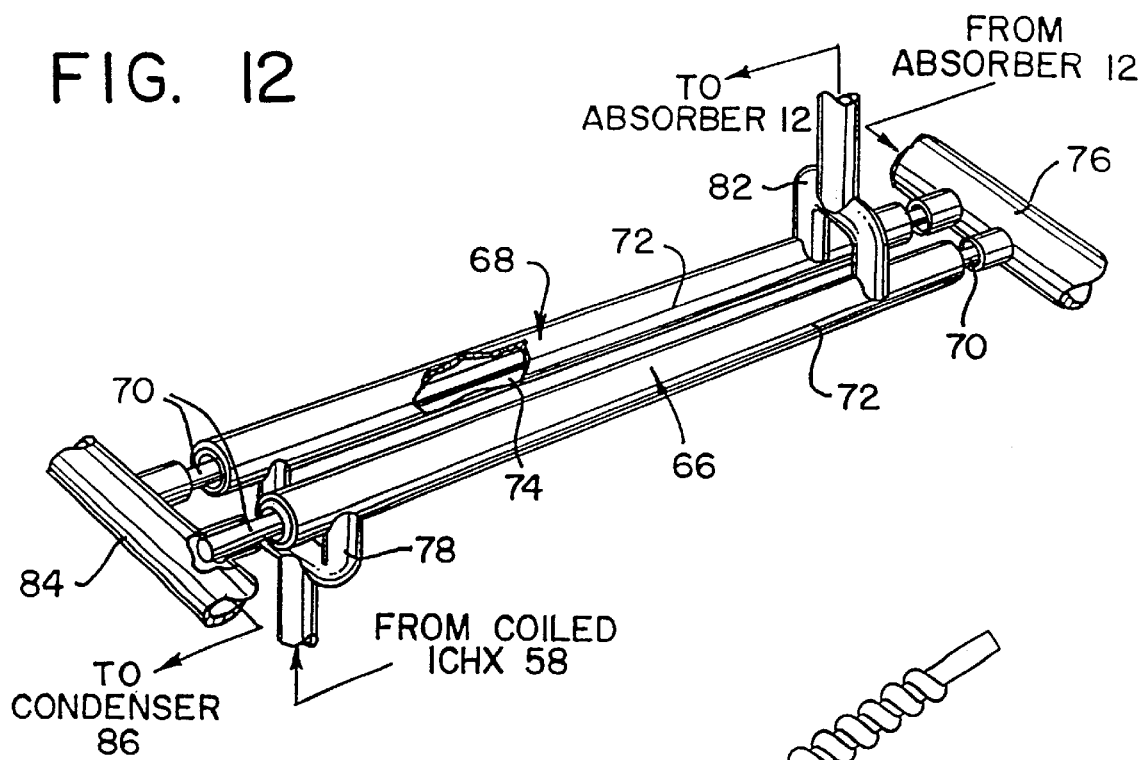
FIG. 12 is an isometric view of a split interchange heat exchanger.
Figure 12A:
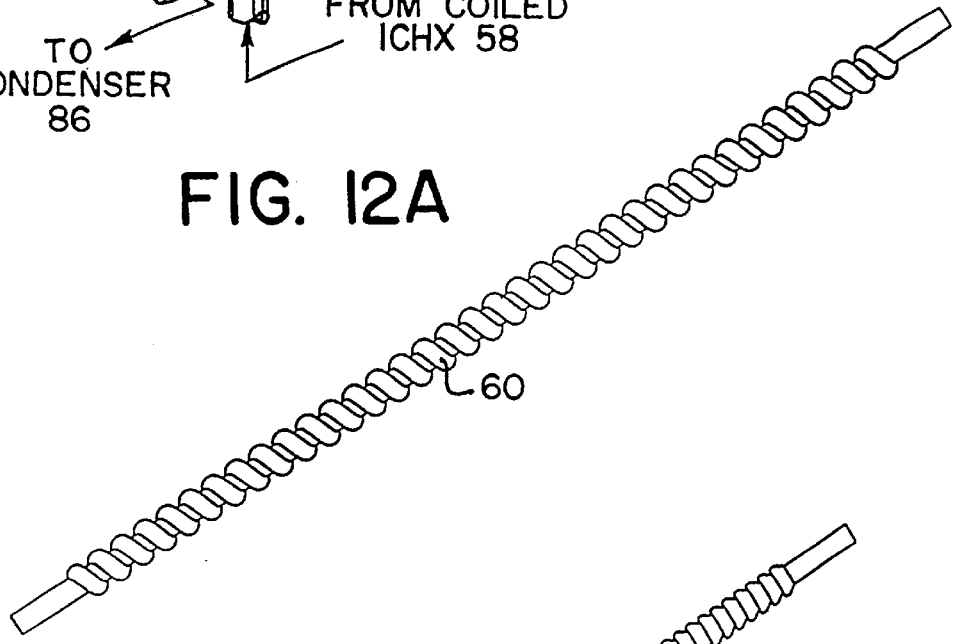
FIG. 12A is a plan view of an inner tube for an interchange heat exchanger having a convoluted profile.
Figure 12B:
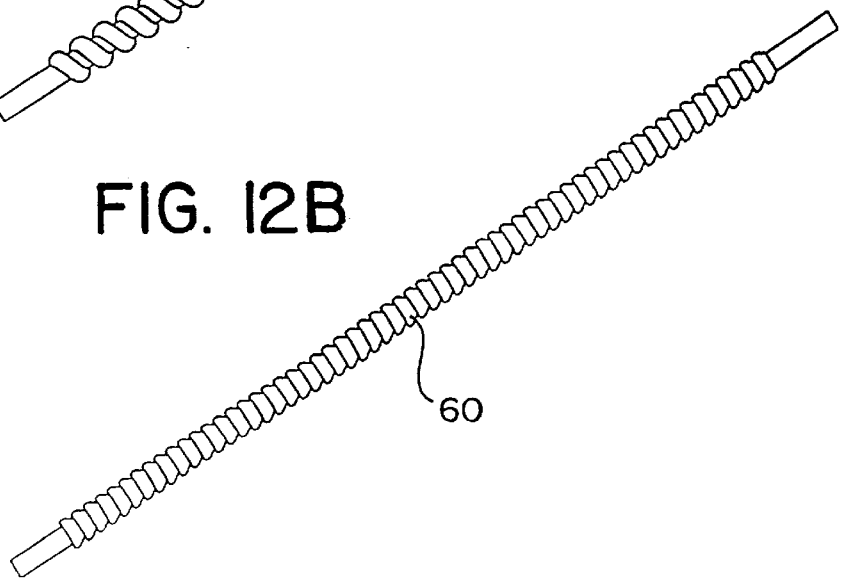
FIG. 12B is a plan view of an inner tube for an interchange heat exchanger having a corrugated profile.

FIG. 12 depicts a split interchange heat exchanger 66 that includes a pair of tube assemblies 68. Each tube assembly 68 comprises an inner tube 70 concentrically disposed within an outer tube 72 to define an annulus 74 therebetween. The dilute liquid desiccant from desiccant absorber 12 is gravity fed to the interchange heat exchanger 66 where it is directed through a manifold 76 and into the inner tubes 70. Concentrated liquid desiccant from boiler 34 is first delivered through coiled interchange heat exchanger 58 and thereafter directed through a U-fitting 78 coupled to the respective outer tubes 72 and into the annuli 74. Alternatively, dilute liquid desiccant is passed through annuli 74 and concentrated liquid desiccant is passed through inner tubes 70. In this manner, heat is transferred from the concentrated liquid desiccant to the dilute liquid desiccant within split interchange heat exchanger 66. The concentrated liquid desiccant is thereafter drawn into a pump 80 (FIGS. 8 and 8A) through a U-fitting 82 coupled to the respective outer tubes 72. The pump 80 delivers the concentrated liquid desiccant to distributor 14 of absorber 12. The partially heated dilute liquid desiccant flows through a manifold 84 to the condenser. During this stager the dilute liquid desiccant dispensed from absorber 12 is raised to a first temperature. As discussed above with respect to coiled interchange heat exchanger 58, the inner tubes 70 may be fabricated from TEFLON and the outer tubes 72 may be constructed from silicone rubber. Likewise, the inner tubes may be provided with a convoluted or corrugated profile as shown in FIGS. 12A and 12B, respectively.

The partially heated liquid desiccant at the first temperature is delivered to a condenser 86 from split interchange heat exchanger 66 as shown in FIGS. 8 and 8A. FIGS. 13 and 14 illustrate a first embodiment of condenser 86 which is comprised of an inner shell 88 disposed within an outer housing 90 defining at least one chamber 92 between inner shell 88 and housing 90. The housing 90 includes a plurality of side walls 94, a top wall 96 and a bottom wall 98. A pair of steam tubes 100 communicate with inner shell 88 through top wall 96 to deliver steam from boiler 34. A pair of air vents 102 likewise communicate with chamber 92 through top wall 96 to evacuate excess air therefrom. A condensate tube 104 communicates with inner shell 88 through bottom wall 98 to drain condensate into a condensate pan 106 (FIG. 8A). An inlet tube 108 communicates with chamber 92 through one of the side walls 94 to deliver partially heated dilute desiccant to condenser 86 from split interchange heat exchanger 66. An outlet tube 110 is similarly disposed to communicate with chamber 92 on an opposite side of condenser 86 to deliver dilute desiccant which is sensibly heated to a second temperature by the latent heat of condensation as the steam condenses in the inner shell 88, to the coiled interchange heat exchanger 58 via the inlet port 54 of U-fitting 52 shown in FIGS. 8 and 11. A fraction of the desiccant flow leaving the condenser may be recirculated to the desiccant absorber 12. This reduces the flow rate to the boiler 34 to lower heat loss and increase energy efficiency. In addition, this maintains a relatively high flow through the absorber 12 and condenser 86 to yield a higher absorption and condensation capacity. To facilitate heat transfer, inner shell 88 is fabricated from materials including inconel, monel, titanium, TEFLON, Teflon-coated copper, Teflon-coated aluminum, and TEFLON-coated stainless steel. The housing 90 is preferably fabricated from materials including Teflon, polycarbonate, polyvinylidene fluoride, polypropylene, silicone rubber, polyethylene, and polystyrene. If a plastic such as TEFLON is used for the housing 90, the wall thickness is made suitably thick to provide the necessary insulating properties.

The condenser 86 may incorporate a plurality of fins 112 located on the exterior of inner shell 88 and a plurality of fins 114 disposed on bottom wall 98 of housing 90. The inner shell 88 may be provided with a plurality of baffles 116 to prevent short circuiting from steam inlets 100 to condensate outlet 104.

Figure 15:
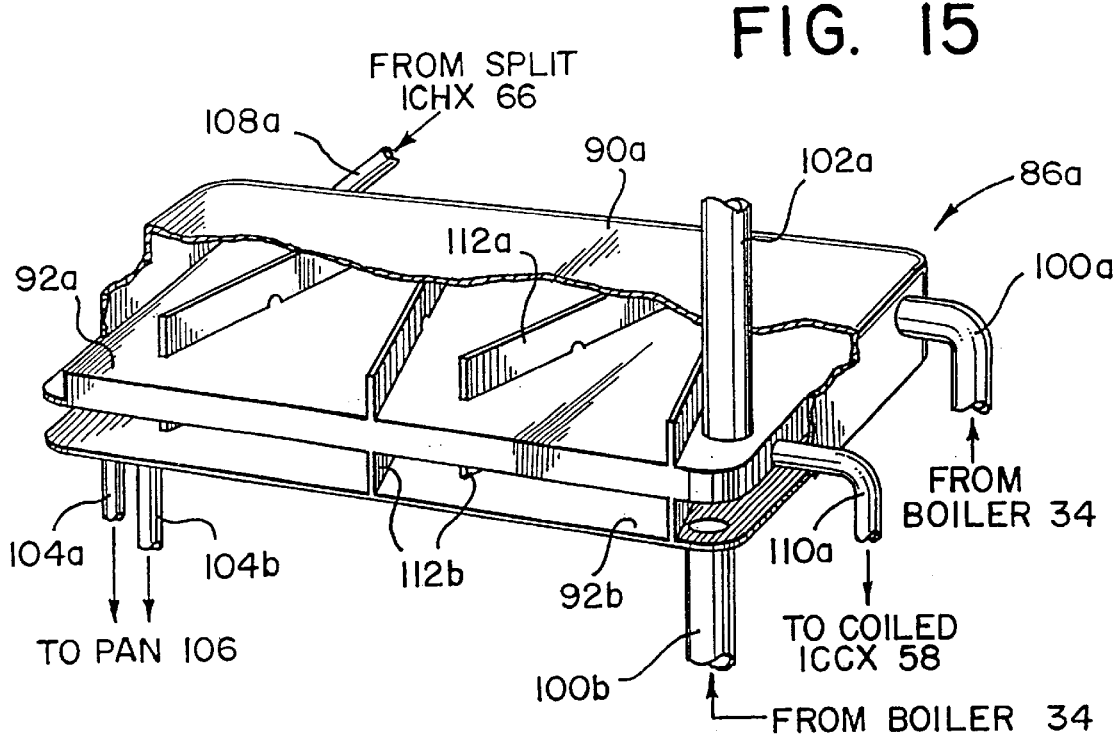
FIG. 15 is an isometric cut-away view of a condenser in a second embodiment.

Although depicted with the steam being directed into the inner shell 88 and the liquid desiccant being directed into the chamber 92, the opposite arrangement may be employed with the liquid desiccant directed into the inner shell 88 and the steam delivered to the chamber 92. FIG. 15 illustrates an alternative embodiment of a condenser 86a including a housing 90a and inner shell 88a, wherein the inner shell 88a segregates housing 90a into two compartments 92a, 92b, respectively. A steam inlet tube 100a communicates with compartment 92a, and a steam inlet tube 100b communicates with compartment 92b. Partially heated dilute desiccant solution is delivered to inner shell 88a through solution inlet 108a, and is sensibly heated by the latent heat of condensation as the steam condenses in the respective chambers 92a, 92b. Condensate flows out of chambers 92a, 92b, via condensate outlets 104a, 104b, respectively. Partially heated dilute desiccant at the second temperature flows out of inner shell 88a through solution outlet 110a to coiled interchange heat exchanger 58. Baffles 112a, 112b are provided in chambers 92a, 92b, respectively.

Figure 16:
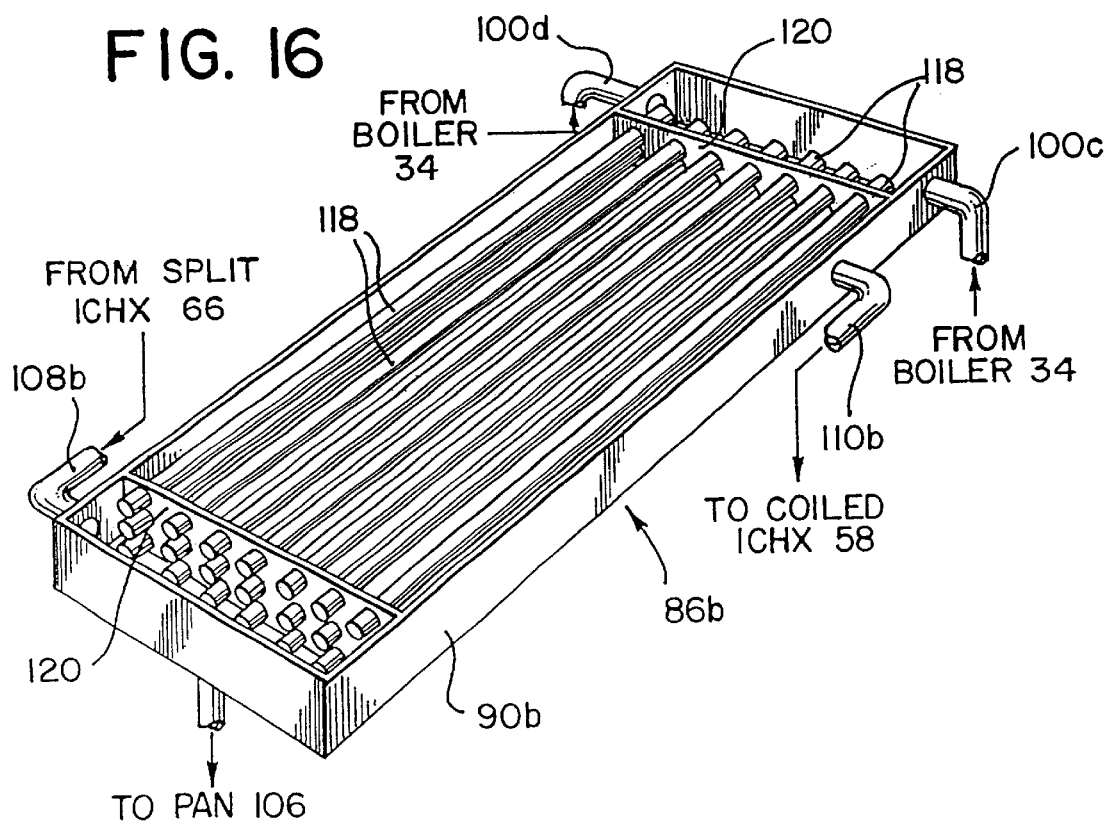
FIG. 16 is an isometric cut-away view of a condenser in a third embodiment.

Referring to FIG. 16, a third embodiment of a condenser 86b is illustrated that includes a housing 90b and a plurality of tubes 118 which may be convoluted or corrugated as described above with regard to the interchange heat exchangers and shown in FIGS. 12A and 12B. The tubes 118 are supported by opposing support plates 120 and communicate with respective steam inlets 100c, 100d through which steam is delivered from boiler 34. The housing 90b includes a liquid desiccant solution inlet 108b to receive dilute liquid desiccant from split interchange heat exchanger 66, and an outlet 110b to deliver partially heated liquid desiccant at the second temperature to the coiled interchange heat exchanger 58. The tubes 118 are preferably fabricated from TEFLON, and the support plates 120 include at least one silicone rubber sheet attached thereto.

FIG. 17 illustrates another embodiment of a condenser 86c utilizing multiple double-pipe heat exchangers. Each double pipe heat exchanger includes an outer straight tube 300 and an inner convoluted tube 302 concentrically disposed within the outer tube. A small annular gap is defined between the outer and inner tubes 300, 302 which forces the fluid to follow a "screw-like" tortuous path through the convolutions at high velocity. This arrangement provides high heat transfer coefficients and condensation capacity. The components can be fabricated from plastics such as polypropylene, TEFLON, PVDF or silicone rubber. Dilute liquid desiccant from split Interchange heat exchanger 66 is directed into a manifold 304. Similarly, steam from boiler 34 flows into a manifold 306 through inlet ports 308. Manifold 304 communicates with the inner convoluted tubes 302. Steam flows through the annuli formed between outer tubes 308 and inner tubes 302 causing the dilute liquid desiccant entering the heat exchangers from manifold 304 to be partially heated to the second temperature. This heated liquid desiccant is delivered to the coiled interchange heat exchanger 58 from exit manifold 310. Condensate is collected in manifold 312, and is then delivered to pan 106. Air vents are utilized to ensure reliable gravity assisted drain flow of the liquid desiccant from the absorber 12 to the boiler 34. Small pieces of TEFLON tape having a micropore structure can be used in the vent assembly. The TEFLON material is hydrophobic and has a micro-pore structure which enables the free passage of air while preventing steam or desiccant leakage. The air vent 314 includes a tube 316 extending upwardly from manifold 310. The tube 316 includes a polypropylene mesh 318 and a piece of TEFLON tape 320 in a laminated structure. Alternatively, conventional float-based air vents, such as air vents manufactured by Honeywell, can be utilized to vent air from the system.

Referring to FIG. 18, another embodiment of the condenser 86d comprises multiple coiled double pipe heat exchangers. Each double pipe heat exchanger includes an outer helically coiled cylindrical tube 300a and an inner convoluted tube 302a concentrically disposed within the outer tube 300a. Steam from boiler 34 enters a manifold 306a, from where it is communicated into the annuli formed between outer tubes 300a and inner tubes 302a. Dilute liquid desiccant is delivered to manifold 304a and thence into the inner tubes 302a. Partially heated liquid desiccant exits into manifold 310a, and is delivered to coiled interchange heat exchanger 58. Condensate flows through outlets 312a to pan 106. This condenser 86d, operates on the same principles and offers the same advantages as the double-pipe condenser 86c described above.

Figure 20:
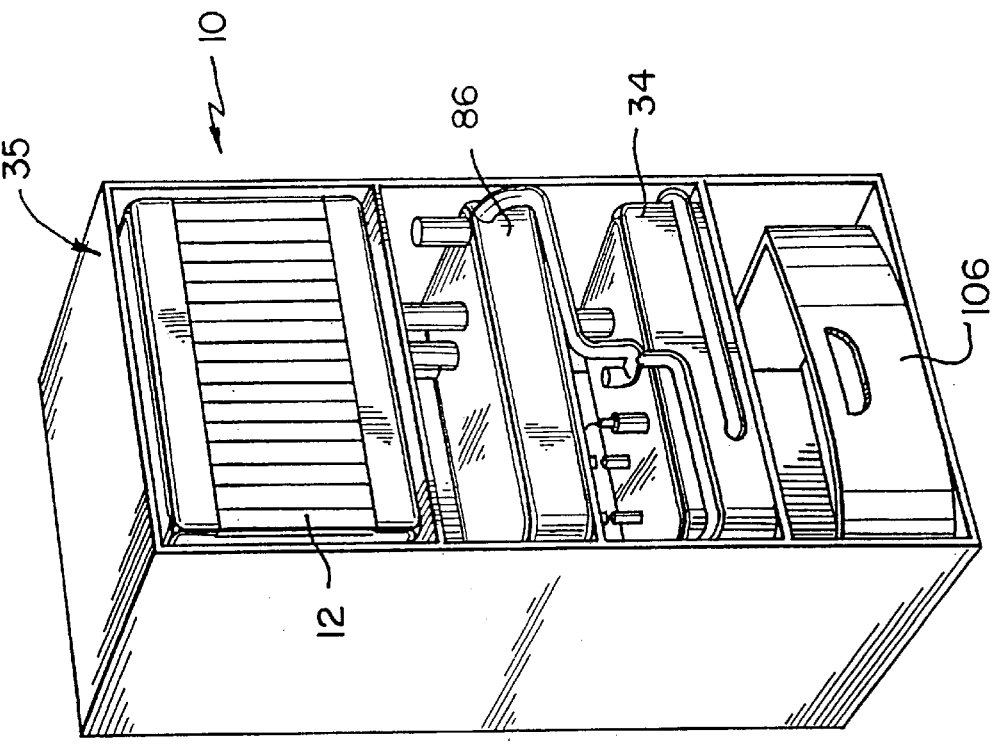
FIG. 20 is an isometric cut-away view depicting the frame and some of the components installed therein.

FIG. 20 illustrates the respective components of the LDA 10 in stacked relation within frame 35 (the components of the absorption air conditioner 202 are not shown).

During the operating cycle, ambient air is drawn into the unit, through absorber 12 and exhausted to the room by fan 23. The moisture in the air is extracted as the air makes contact with the liquid desiccant wicking across the microglass fiber wick plates 20, 22. Dilute liquid desiccant is gravity fed from drain pan 24 of absorber 12 to manifold 76 of split interchange heat exchanger 66, wherein it is raised to a first temperature through heat transfer from concentrated liquid desiccant flowing through annuli 74. The dilute liquid desiccant at the first temperature is then delivered to the condenser 86, in which the latent heat of condensation as the steam condenses sensibly heats the liquid desiccant to the second temperature. The liquid desiccant at the second temperature is thereafter delivered to the coiled interchange heat exchanger 58 in which it is further heated to a third temperature prior to introduction into boiler 34 for regeneration. The coiled interchange heat exchanger 58 recovers waste heat radiating from the walls 36 of boiler 34. The concentrated liquid desiccant solution produced by boiling the liquid desiccant is drawn through the coiled interchange heat exchanger 58 and split interchange heat exchanger 66, and thereafter delivered to distributor 14 of absorber 12 by pump 80. The stacking of the respective components as shown in FIG. 8 provides for the gravity feed of dilute liquid desiccant from absorber 12 to boiler 34 through the first and second heat exchangers and the condenser, thereby eliminating the need for multiple pumps in the system.

FIG. 21 illustrates a liquid desiccant dehumidifier, indicated generally at 450, wherein components which are similar to those employed in the aforedescribed liquid desiccant dehumidifier 200 have common reference numerals. The liquid desiccant dehumidifier, which may hereinafter be referred to as the dehumidifier 450, is operative to dehumidify incoming ambient air prior to effecting sensible cooling of the air in an air absorption air conditioner, such as the aforedescribed air conditioner 202. In similar fashion to the liquid desiccant dehumidifier 200, the dehumidifier 450 includes an absorber 452, a condenser 454 and a boiler 456 which are supported in generally vertically stacked relation above a condensit pan 106. As will be described, the boiler 456 includes a coiled interchange heat exchanger 458 disposed between the boiler 456 and condenser 454. A split interchange heat exchanger 66' is disposed between the condenser 454 and the absorber 452. As with the aforedescribed embodiments of the liquid desiccant dehumidifier 200, liquid desiccant drains from the absorber 452 to the boiler 456 through the split interchange heat exchanger 66' and condenser 454 by gravity. A pump 80 is operative to draw concentrated desiccant from the boiler at a relatively high temperature through the heat exchanger 66' and pump the concentrated desiccant into the absorber.

Figure 22:
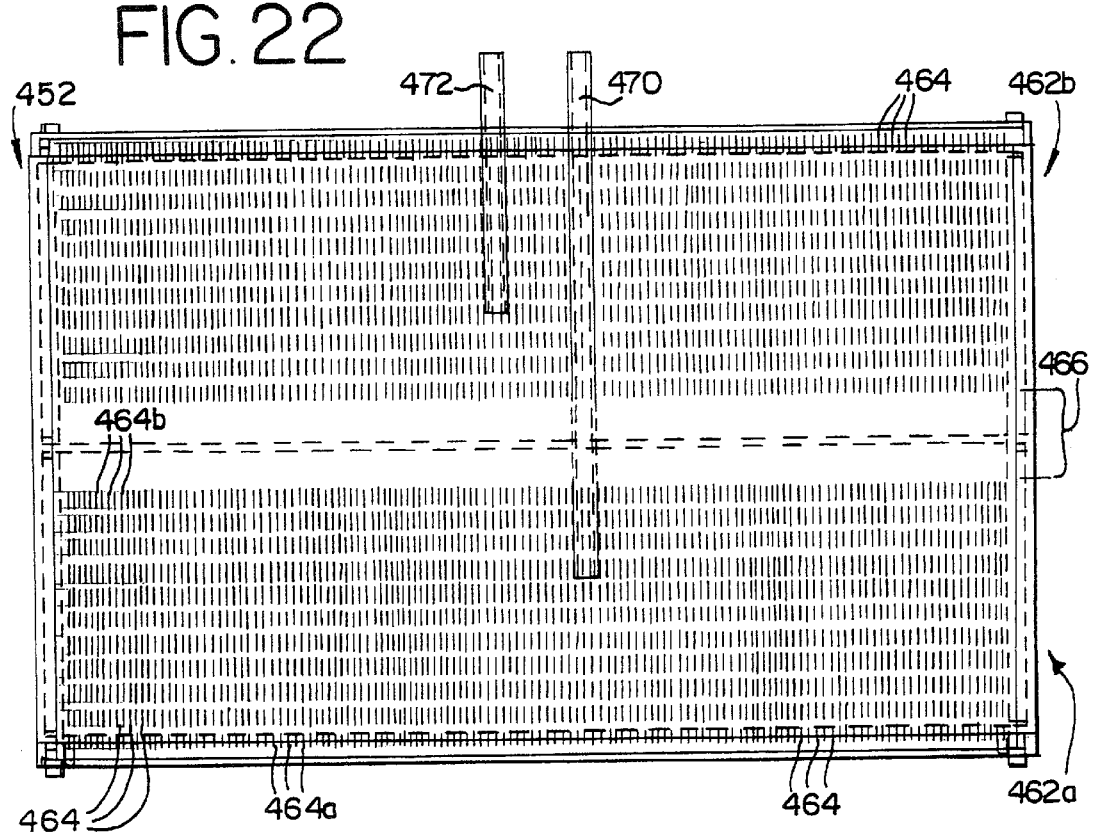
FIG. 22 is a plan view of the absorber illustrated in FIG. 21 but with the top plate removed to illustrate the gap between the two stacks of absorber plates for improved distribution of mass transfer resulting from passive mixing of air within the gap.
Figure 23:
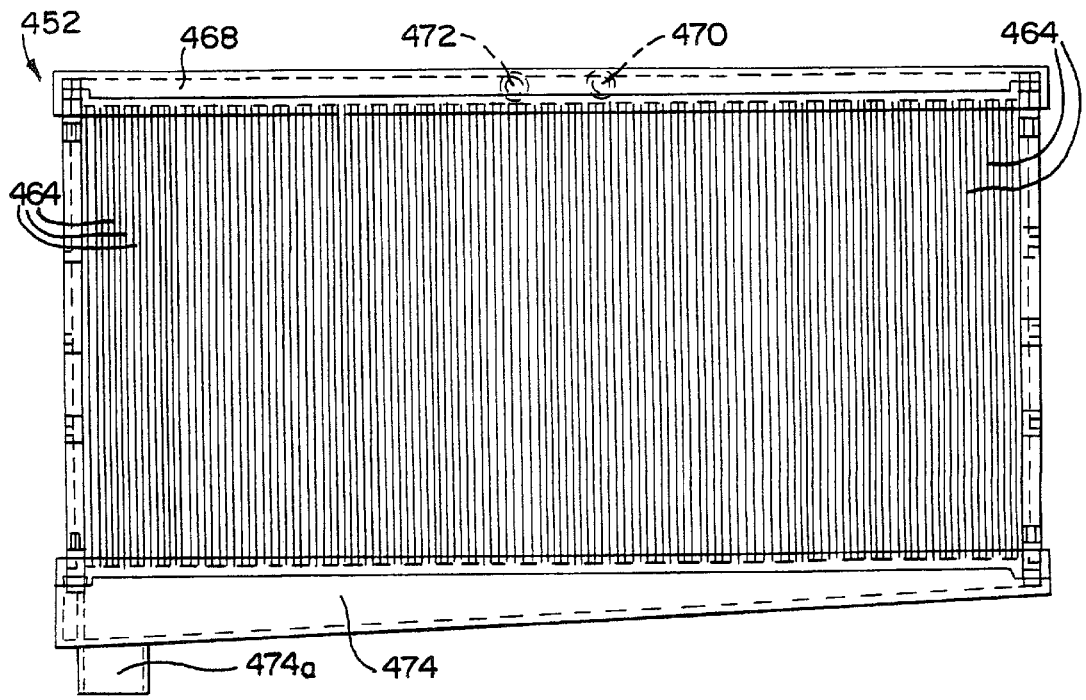
FIG. 23 is a front elevational view of the absorber illustrated in FIG. 22.

Referring to FIGS. 22 and 23, taken in conjunction with FIG. 21, the liquid desiccant absorber 452 is operative to absorb moisture contained in ambient air entering the dehumidifier 450. In similar fashion to the aforedescribed desiccant absorber 12, the absorber 452 is constructed and arranged for receiving concentrated liquid desiccant at the top of the desiccant absorber and dispensing dilute liquid desiccant from the bottom of the absorber. The desiccant liquid may comprise a conventional desiccant solution as aforedescribed.

In the embodiment illustrated in FIGS. 22 and 23, the absorber 452 includes two horizontally arranged generally equal length rows or stacks 462a and 462b of relatively closely spaced vertically disposed microglass fiber plates 464 which are preferably of substantially equal rectangular size and thickness, although the size and thickness of the plates may be varied and need not be equal. The fiber plates 464 are supported by a suitable frame structure so that each of the plates in row 462a is generally coplanar with a corresponding plate in row 462b and so that the laterally opposite vertical marginal edges of the fiber plates in each row lie in common substantially vertical planes, as represented by the outer marginal edges 464a and the rearward marginal edges 464b, respectively, on the row of plates 462a shown in FIG. 22.

As shown in FIG. 22, the rows of microglass fiber plates 462a and 462b are disposed in parallel spaced relation so that a gap or space 466 is provided between the exposed mutually opposed parallel rows of plates. A top plate 468 of rectangular plan configuration is supported on the support frame for the fiber plates 464 so as to overlie the upper marginal edges of both rows 462a and 462b of fiber plates 464. The plate 468 is also made of a microglass fiber material and serves as a distribution sheet to distribute concentrated desiccant introduced into the top plate through a pair of input tubes 470 and 472 which have discharge ends located, respectively, generally centrally over the rows 462a and 462b of fiber plates 464. The desiccant input tubes 470 and 472 are connected, respectively, to the pump 80 as shown in FIG. 21 so as to receive concentrate desiccant drawn from the heat exchanger 66'.

In operation, air is drawn through the absorber 452 by the fan 23 in a direction normal to the plan of the coplanar vertical marginal edges of the fiber plates 464 so that moisture in the air is removed as the air makes contact with the liquid desiccant that has wetted the fiber plates. As the desiccant dehumidifies the air stream, the moisture absorbing capability of the desiccant is reduced and the diluted desiccant is collected in a drain pan 474 similar to the aforedescribed drain pan 24. A drain tube 474a extends from the lower wall or bottom of the drain pan 474 and includes a one-way or check valve preventing reverse flow into the absorber. By separating the rows or stacks 462a and 462b of microglass fiber plates 464 so as to create a vertically oriented gap 466 between the stacks of plates, the air passing between the stacks of fiber plates intermixes in the gap as the air flows between the respective stacks of fiber plates. This intermixing, which may alternatively be termed passive mixing or re-mixing of the air before it enters the second row or stack of plates, improves the air distribution and reduces channeling or short circuiting as the air traverses the absorber. This improves the distribution of the mass transfer driving force and increases the mass transfer coefficient with resulting increase in capacity of the absorber. This arrangement also enables the area of the fiber plates to be reduced, thereby reducing the amount of desiccant residing in the plates with a corresponding reduction in cost. It will be understood that the absorber 452 may include more than two parallel rows of fiber plates 464 which are spaced from each other so as to create a mixing gap between each pair of plate rows. The absorber 452 may be employed in any of the dehumidifier systems schematically shown in FIGS. 1–7.

Referring to FIGS. 24–26, taken in conjunction with FIG. 21, the boiler 456, which also may be employed in the various liquid desiccant dehumidifier systems illustrated schematically in FIGS. 1–7, includes a relatively narrow elongated generally U-shaped housing or vessel 480 that includes a lower reservoir or trough-like portion 482 and a top plate 484 adapted to be releasably seated within the lower portion 482. The lower housing portion 482 is of generally U-shape in transverse cross-section, as shown in FIG. 26, and defines an internal flow channel or passage 482a adapted to receive liquid desiccant from the condenser 454. To this end, a desiccant inlet tube 486 communicates with an inlet end of the internal channel 482a to facilitate the introduction of desiccant into the internal channel. An outlet port or tube 488 communicates with the opposite outlet end of the channel 482a to facilitate withdrawal of heated concentrated desiccant from the channel after it has passed from the inlet to the outlet. A heating element 490, which may take the form of an electrical heating element or coil, or a gas fired heat tube, is disposed within the lower region of the channel 482a for heating liquid desiccant introduced into the inlet 486 and passing through the channel to the outlet end 488. A plurality of steam outlet ports 492 are spaced along the length of the upper top plate 484 to facilitate discharge of steam to the condenser 454.

Referring particularly to FIG. 24, the interchange heat exchanger 458 is connected to the desiccant end inlet 486 and outlet end 488 of the boiler 480. The heat exchanger 458 is operative to receive dilute desiccant from the condenser 454, pass the dilute desiccant into the boiler inlet end 486, and receive the heated concentrated desiccant from the outlet end 488 of the boiler for passage to the inlet 78 of the heat exchanger 66' from which the concentrated desiccant is pumped into the absorber 452. To this end, the heat exchanger 458 includes a pair of inner and outer coaxial flow tubes 498 and 500, respectively, that define an annular flow passage therebetween operative to receive dilute desiccant from the condenser. The coaxial tubes 498 and 500 are helically wound or coiled internally of the generally U-shaped boiler 480 with the outer tube 500 being connected to the boiler inlet end 486 and the inner flow tube 498 being connected to the boiler outlet end 488. Conversely, the inner flow tube 498 may be connected in flow communication with the boiler inlet end 486, and the outer flow tube 500 connected to the boiler outlet end 488.

By providing a relatively long flow path within the boiler 480 for the dilute desiccant to traverse from the inlet to the outlet, highly efficient heating of the desiccant takes place without mixing caused by boiling of the desiccant as it passes from the boiler inlet to the boiler outlet. As the desiccant flows from the inlet or cold end of the boiler to the hot or discharge end 488, the desiccant is heated, boiled and concentrated. This arrangement reduces the mass of the desiccant that otherwise has to be maintained at the highest temperature in the boiler, thereby increasing energy efficiency.

Referring to FIGS. 27 and 28, taken in conjunction with FIG. 21, the condenser 454, which may also be employed in the various liquid desiccant dehumidifier system of FIGS. 1–7, includes a pair of parallel spaced generally vertical walls in the form of generally oval shaped inner and outer walls 506 and 508 interconnected at their lower marginal edges by a bottom wall (not shown) so as to establish an endless flow path within the condenser. This flow path receives steam through a pair of steam inlets 510 connected in flow communication with the steam outlets 492 on the boiler vessel 480. The steam passage defined between the walls 506 and 508 is closed on its upper end by a suitable top wall 512 (removed from the condenser shown in FIG. 27).

A convoluted or corrugated flow tube 514, such as illustrated in FIGS. 12A or 12B, is positioned within the steam path defined between the walls 506 and 508 of the condenser 454 and has an inlet end 514a connected to the heat exchanger 66' so as to receive desiccant from the heat exchanger 66'. The corrugated flow tube 514 has a desiccant outlet end 514b that is connected to the annular flow path defined between the coaxial tubes 498 and 500 of the heat exchanger 458.

The convoluted desiccant flow tube 514 preferably contacts at least one of the condenser walls 506, 508 so as to improve heat transfer from the steam to the convoluted tube. Use of a convoluted tube 514 also provides greater flexibility and provides larger heat transfer area with resulting improved heat transfer to the desiccant flowing through the tube 514. It will be understood that while the condenser walls 506, 508 are illustrated as being generally oval in configuration, they could define a circular or generally square steam passage housing the desiccant flow tube 514. Moreover, more than two concentric walls could be provided providing a plurality of parallel channels or paths each of which has a convoluted tube therein for effecting increased heat transfer to desiccant flowing through the convoluted tubes.

While preferred embodiments of the present invention have been illustrated and described, it will be understood that changes and modifications may be made therein without departing from the invention in its broader aspects. Various features of the invention are defined in the following claims.

What is claimed is:

1. A boiler for boiling a dilute liquid having a moisture constituent so as to evaporate moisture from the dilute liquid and reconstitute the dilute liquid into a concentrated liquid, said boiler including an inner vessel and an outer vessel defining an elongated liquid chamber therebetween, said outer vessel being adapted to receive dilute liquid into said liquid chamber, a heating element disposed in said inner vessel for heating liquid within said inner vessel, a heat exchange tube extending along said chamber and being operative to effect flow of heated liquid from said inner vessel through said tube so as to heat dilute liquid in said chamber, said inner vessel being operative to receive heated liquid from said chamber when dilute liquid therein has risen to a predetermined level, whereby dilute liquid introduced into said liquid chamber is preheated prior to entering said inner vessel.

2. A boiler as defined in claim 1 wherein said inner vessel includes a bottom wall, said heating element being disposed proximate said bottom wall, said heat exchange tube having an entry end communicating with said inner vessel at a point spaced above said heating element so that said heating element is always immersed in liquid within said inner vessel.

* * * * *